United States Patent
Schulze et al.

(10) Patent No.: US 8,066,458 B2
(45) Date of Patent: Nov. 29, 2011

(54) AIR CARGO CENTERLINE RESTRAINT SYSTEM HAVING RESTRAINTS MOUNTED OVER FLOOR JOISTS OUTSIDE THE WINGBOX AREA FOR LATERAL SUPPORT

(75) Inventors: Gregory J. Schulze, Jamestown, ND (US); Gregory A. Brekken, Jamestown, ND (US); LaDell E. Papacek, Bel Aire, KS (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 13/038,498

(22) Filed: Mar. 2, 2011

(65) Prior Publication Data

US 2011/0146045 A1    Jun. 23, 2011

Related U.S. Application Data

(60) Division of application No. 12/124,329, filed on May 21, 2008, now Pat. No. 7,922,431, which is a continuation-in-part of application No. 11/393,625, filed on Mar. 30, 2006, now Pat. No. 7,665,938.

(60) Provisional application No. 60/940,200, filed on May 25, 2007.

(51) Int. Cl.
  *B60P 7/08* (2006.01)
(52) U.S. Cl. ............................ 410/80; 410/77; 410/92
(58) Field of Classification Search ............... 410/77, 410/78, 79, 80, 69, 92, 94; 248/503, 503.1; 244/118.1, 137.1; 414/536
See application file for complete search history.

(56) References Cited

U.S. PATENT DOCUMENTS

| | | |
|---|---|---|
| 3,094,226 A | 6/1963 | Gutridge |
| 3,262,588 A | 7/1966 | Davidson |
| 3,906,870 A | 9/1975 | Alberti |
| 5,004,387 A | 4/1991 | Jensen et al. |
| 5,104,064 A | 4/1992 | Kuitems |
| 5,131,606 A | 7/1992 | Nordstrom |
| 5,234,297 A | 8/1993 | Wieck et al. |
| 5,316,242 A | 5/1994 | Eilenstein-Wiegmann et al. |

(Continued)

OTHER PUBLICATIONS

Office Action in counterpart German Application No. 10 2008 025 148.8-22, dated Apr. 30, 2010.

*Primary Examiner* — Stephen Gordon
(74) *Attorney, Agent, or Firm* — Womble Carlyle

(57) ABSTRACT

A cargo loading system capable of retaining a pallet along a centerline of a cargo aircraft and outside the wingbox area of the aircraft includes a number of devices. Included among these are first and second centerline end restraints mounted on the centerline, at least one caster panel mounted on one side of the cargo hold and across the centerline from a side door of the aircraft, and a plurality of mechanical restraints mounted on a floor of the cargo hold on either side of the centerline and outside the wingbox area. The first and second centerline end restraints each have at least one retractable lockhead configured and dimensioned to engage an end of a pallet. The at least one caster panel includes at least one retractable guide formed at a first end thereof, and at least one retractable guide formed along a first side thereof. Lastly, the plurality of mechanical restraints are mounted with a portion of each mechanical restraint overlying a laterally extending floor joist in the cargo hold, such that a lateral load applied to a given mechanical restraint is transferred to at least one laterally extending floor joist.

10 Claims, 30 Drawing Sheets

U.S. PATENT DOCUMENTS

| | | | |
|---|---|---|---|
| 5,370,342 | A | 12/1994 | Nordstrom |
| 5,486,077 | A | 1/1996 | Nutting |
| 5,564,654 | A | 10/1996 | Nordstrom |
| 5,957,406 | A | 9/1999 | Nelson et al. |
| 6,068,214 | A | 5/2000 | Kook et al. |
| 6,193,453 | B1 | 2/2001 | Kernkamp |
| 6,270,300 | B1 | 8/2001 | Huber et al. |
| 6,328,154 | B1 | 12/2001 | Huber |
| 6,413,029 | B1 | 7/2002 | Kernkamp |
| 6,485,238 | B2 | 12/2002 | Segura |
| 6,517,028 | B2 | 2/2003 | Huber |
| 6,557,800 | B2 | 5/2003 | Medina et al. |
| 6,729,818 | B1 | 5/2004 | Yee et al. |
| 6,926,481 | B2 | 8/2005 | Huber |
| 7,922,431 | B2 * | 4/2011 | Schulze et al. .................. 410/80 |
| 2003/0057326 | A1 | 3/2003 | Medina et al. |
| 2003/0156914 | A1 | 8/2003 | Huber |
| 2005/0224644 | A1 | 10/2005 | Huber et al. |
| 2005/0224645 | A1 | 10/2005 | Huber |
| 2007/0086870 | A1 | 4/2007 | Schulze et al. |
| 2007/0095978 | A1 | 5/2007 | Oetken et al. |
| 2007/0237598 | A1 | 10/2007 | Schulze |

* cited by examiner

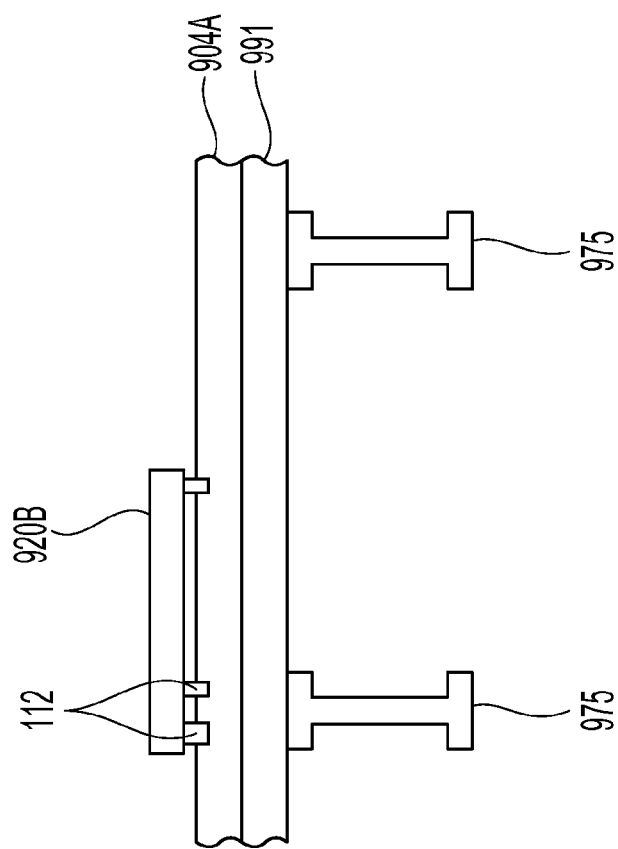
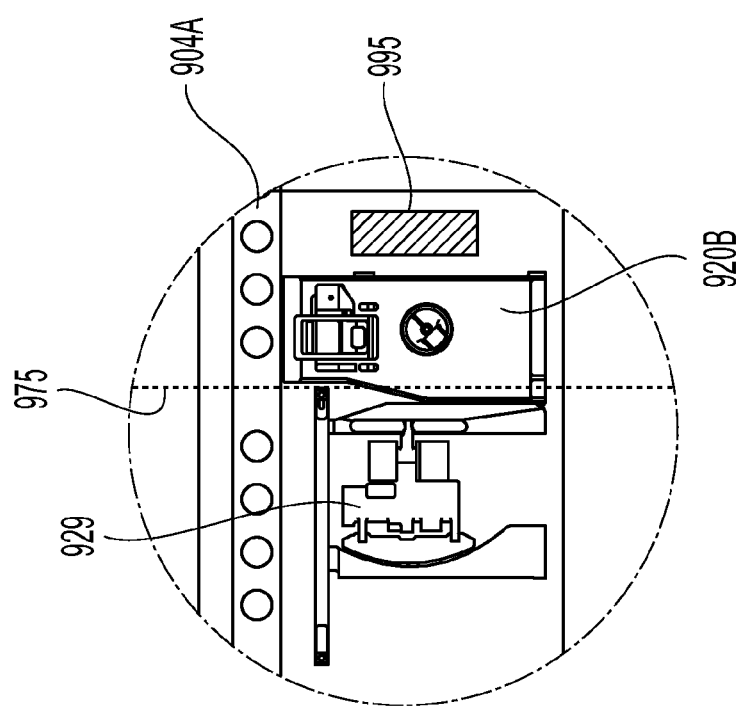
Fig. 22B
Fig. 22A

AIR CARGO CENTERLINE RESTRAINT SYSTEM HAVING RESTRAINTS MOUNTED OVER FLOOR JOISTS OUTSIDE THE WINGBOX AREA FOR LATERAL SUPPORT

RELATED APPLICATIONS

This application is a Divisional of U.S. patent application Ser. No. 12/124,329, filed May 21, 2008, now U.S. Pat. No. 7,922,431, which: (a) is a Continuation-in-part of U.S. application Ser. No. 11/393,625, filed Mar. 30, 2006, now U.S. Pat. No. 7,665,938, and (b) also claims priority to U.S. Provisional Application No. 60/940,200, filed May 25, 2007. The contents of the aforementioned applications are incorporated by reference in their entirety.

BACKGROUND OF THE INVENTION

1. Field of the Invention

The present invention is related to a restraint system for loading air cargo along a centerline of a cargo hold.

2. Background

Commercial aircraft carry cargo in containers and pallets, referred to collectively as unit load devices (ULDs). ULDs are available in several different standard configurations with different lengths and widths. During loading and unloading operations, ULDs must be guided within the cargo compartment. During flight, ULDs must be retained to prevent damage to the aircraft and the cargo. Floor-mounted devices, such as guides and restraints are typically used for these purposes and some such devices (referred to herein as a "guide/restraint") serve both functions.

The deck of a Boeing 747 main cargo compartment is configured with a multitude of longitudinally extending retaining devices such as seat tracks (sometimes referred to as "seat rails") and lock trays to which such guides, restraints and guide/restraints (collectively, "conveying devices") are attached. A number of these retaining devices and conveying devices are positioned to accommodate some containers in predetermined locations in a side-by-side configuration along the centerline of the 747 main cargo deck.

From time to time, a 747 main cargo compartment must carry out-sized cargo (i.e., cargo that does not fit in standard positions because it would interfere with the inside contour of a cargo hold). An example of out-sized cargo might be a large turbine engine which, due to its large width and circular profile, cannot be loaded in a standard location close to the cargo hold sidewall. In such case, the out-sized cargo is loaded onto a standard-size pallet which in then placed along the centerline of the cargo hold. Currently, standard-sized pallets for air cargo transport are approximately 96 inches wide and either 20 feet, 16 feet or 10 feet in length. Mounting such a pallet along the centerline results in the long sides of a pallet extending about 48 inches on either side of the centerline.

Currently, the 747 cargo deck is not equipped with guide/restraints that are suitable for both guiding containers and retaining centerline mounted pallets. As a result, on a 747 main cargo deck, a centerline loaded pallet is normally tied down using straps. This method of restraining the pallet requires a large amount of manpower, requiring a number of personnel trained to properly strap cargo securely. It also delays the unloading of the such cargo, due to the time it takes to safely remove the straps at the destination.

SUMMARY OF THE INVENTION

In one aspect, the present invention is directed to an aircraft having a cargo hold having a cargo hold provided with a cargo loading system configured to accommodate any one of a plurality of standard-sized pallets of different lengths along a centerline of the aircraft. Such a loading system comprises a plurality of mechanical restraints mounted on a floor of the cargo hold on either side of the centerline, each of said mechanical restraints including a lockhead rotatable between a retracted position and an upright position. The plurality of mechanical restraints are mounted aft of a wingbox area of the aircraft, and at least a portion of each mechanical restraint overlies a laterally extending structural floor joist of the aircraft such that a lateral load applied to a given mechanical restraint is transferred to at least one laterally extending floor joist.

In another aspect, the present invention is directed to such an aircraft having a cargo hold in which a standard-sized pallet is retained. The standard-sized pallet is positioned such that it straddles the centerline, and opposite sides of the pallet are engaged by upright lockheads belonging to at least some of said plurality of mechanical restraints on either side of the centerline.

In yet another one aspect, the present invention is directed to a method of modifying a cargo aircraft so that a cargo hold thereof can accommodate any one of a plurality of standard-sized pallets of different lengths along a centerline of the aircraft. The method comprises mounting first and second centerline end restraints on the centerline and spaced apart from each other by a first predetermined distance, the centerline end restraints each comprising at least one retractable lockhead, the first predetermined distance selected such that the centerline restraints are capable of engaging opposite ends of a pallet of a first predetermined length. The method also includes mounting at least one caster panel on one side of the cargo hold and across the centerline from a side door of the aircraft, the at least one caster panel comprising at least one retractable guide formed at a first end thereof, and at least one retractable guide formed along a first side thereof. In additional the method also includes mounting at least eight mechanical restraints on a floor of the cargo hold on either side of the centerline, each of said mechanical restraints including a lockhead rotatable between a retracted position and an upright position. In the inventive method, at least a portion of each of said plurality of mechanical restraints overlies a laterally extending floor joist in the cargo hold; and said first and second centerline restraints, said at least one caster panel and said at least eight mechanical restraints are all mounted aft of a wingbox area of the cargo aircraft.

In yet another aspect, the present invention is directed to a kit for modifying a cargo aircraft so that a cargo hold thereof can accommodate any one of a plurality of standard-sized pallets of different lengths along a centerline of the aircraft. The kit includes first and second centerline end restraints mountable on the centerline and spaced apart from each other by a first predetermined distance, the centerline end restraints each comprising at least one retractable lockhead configured and dimensioned to engage an end of a pallet of a first predetermined length. The kit also includes at least one caster panel mountable on one side of the cargo hold and across the centerline from a side door of the aircraft, the at least one caster panel comprising at least one retractable guide formed at a first end thereof, and at least one retractable guide formed along a first side thereof. The kit further includes at least eight mechanical restraints mountable on a floor of the cargo hold on either side of the centerline, each of said mechanical restraints including a lockhead rotatable between a retracted position and an upright position.

BRIEF DESCRIPTION OF THE DRAWINGS

FIG. 22A shows an enlarged view of a portion of FIG. 22.

FIG. 22B shows a cross-sectional view taken along lines 22B-22B of FIG. 22.

DETAILED DESCRIPTION OF THE INVENTION

Figure 1:
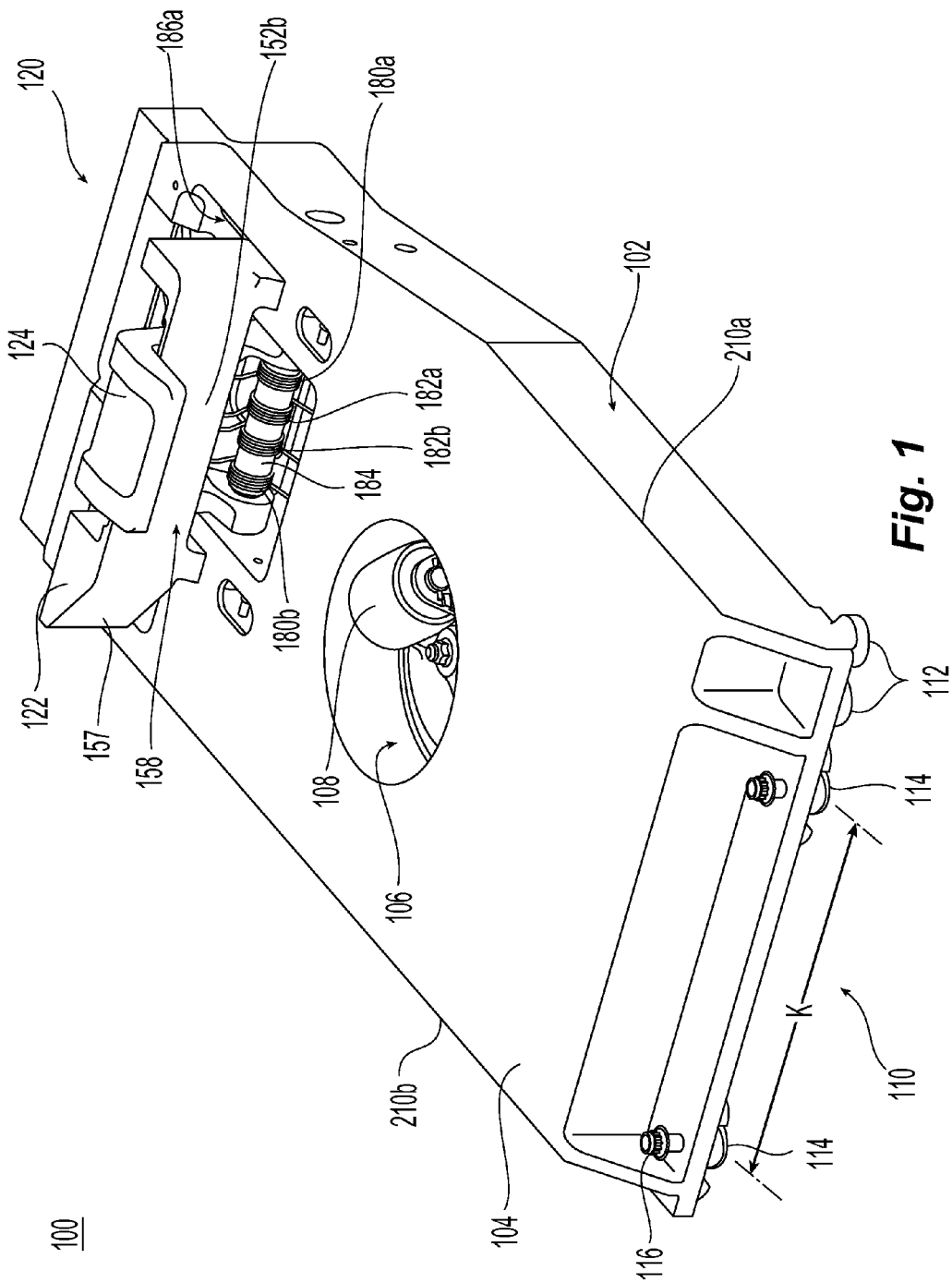
FIG. 1 shows a front perspective view of a first embodiment of a guide/restraint in accordance with the present invention, with the guide and lockhead both in the upright position.

FIG. 1 shows a perspective view of a first type of guide/restraint 100 in accordance with a first embodiment of the present invention with both the rotatable guide 122 and the rotatable lockhead 124 in the upright position. As seen in the rear perspective view of FIG. 2, a rotatable U-shaped lockhead pawl 126 supports the lockhead 124.

Figure 2:
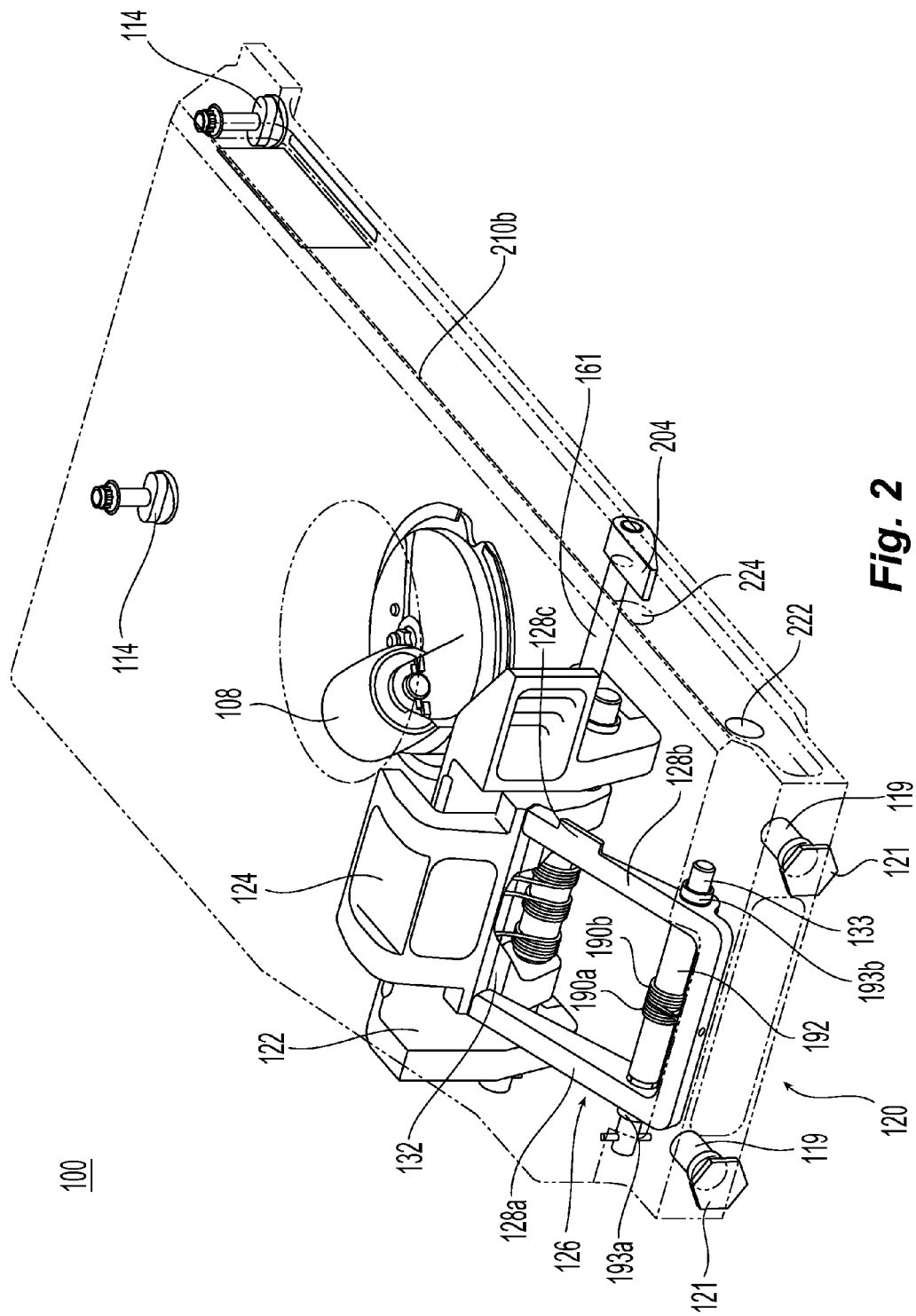
FIG. 2 shows a rear perspective view the guide/restraint of FIG. 1 with the base seen in phantom.
Figure 3A:
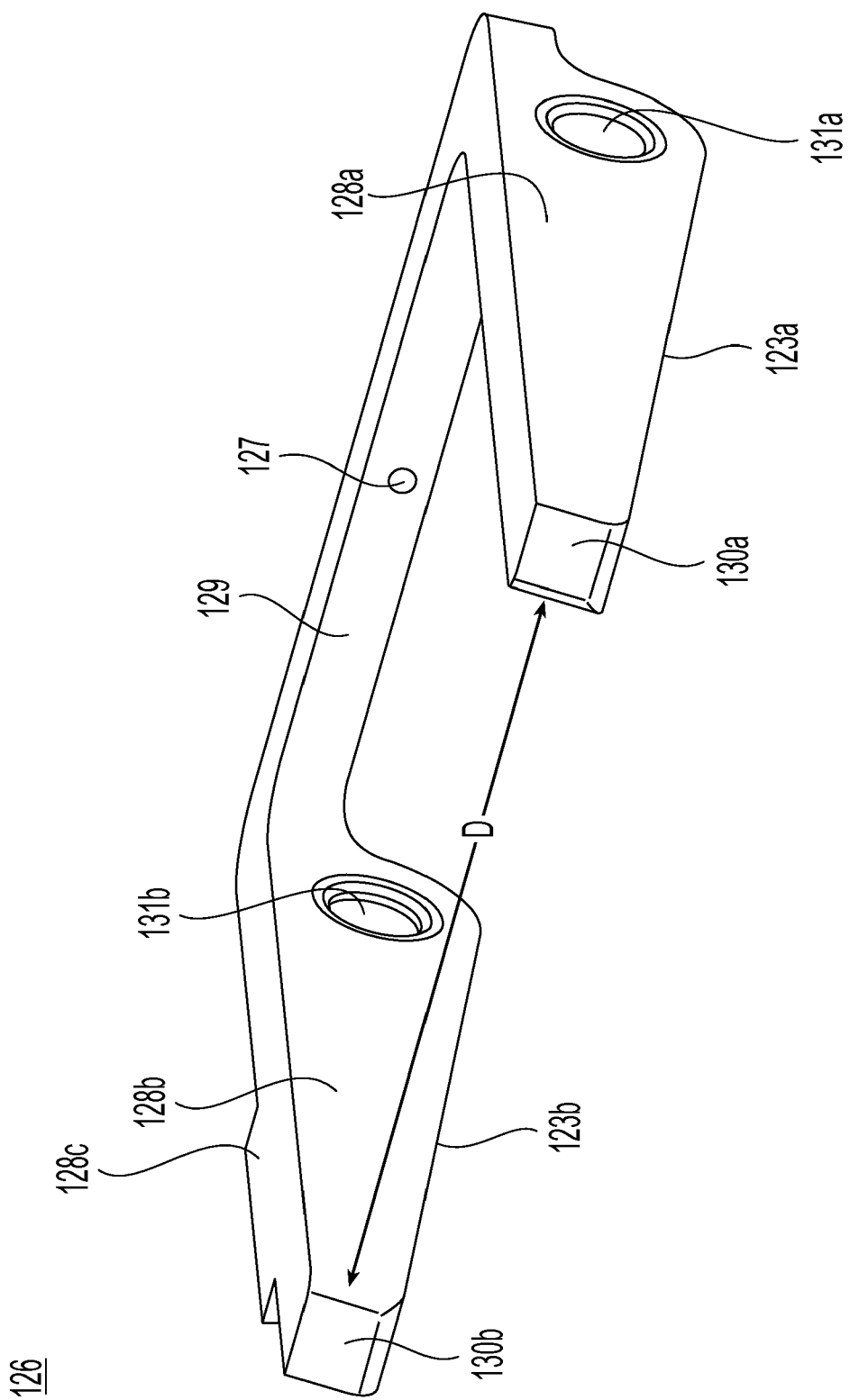
FIG. 3A show a U-shaped pawl configured to support the rotated lockhead in the upright position
Figure 3B:
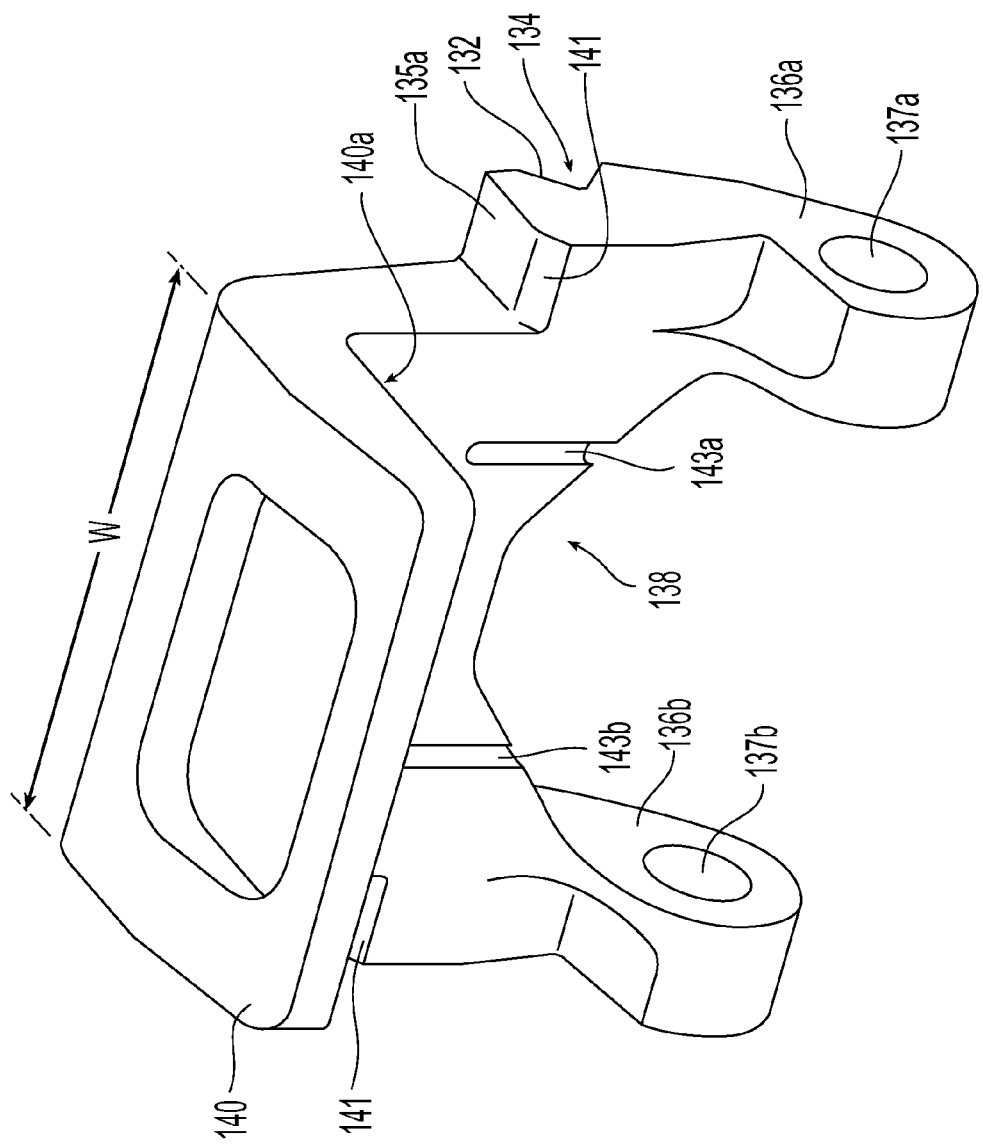
FIG. 3B shows a rotatable lockhead which serves as the restraint member.
Figure 5A:
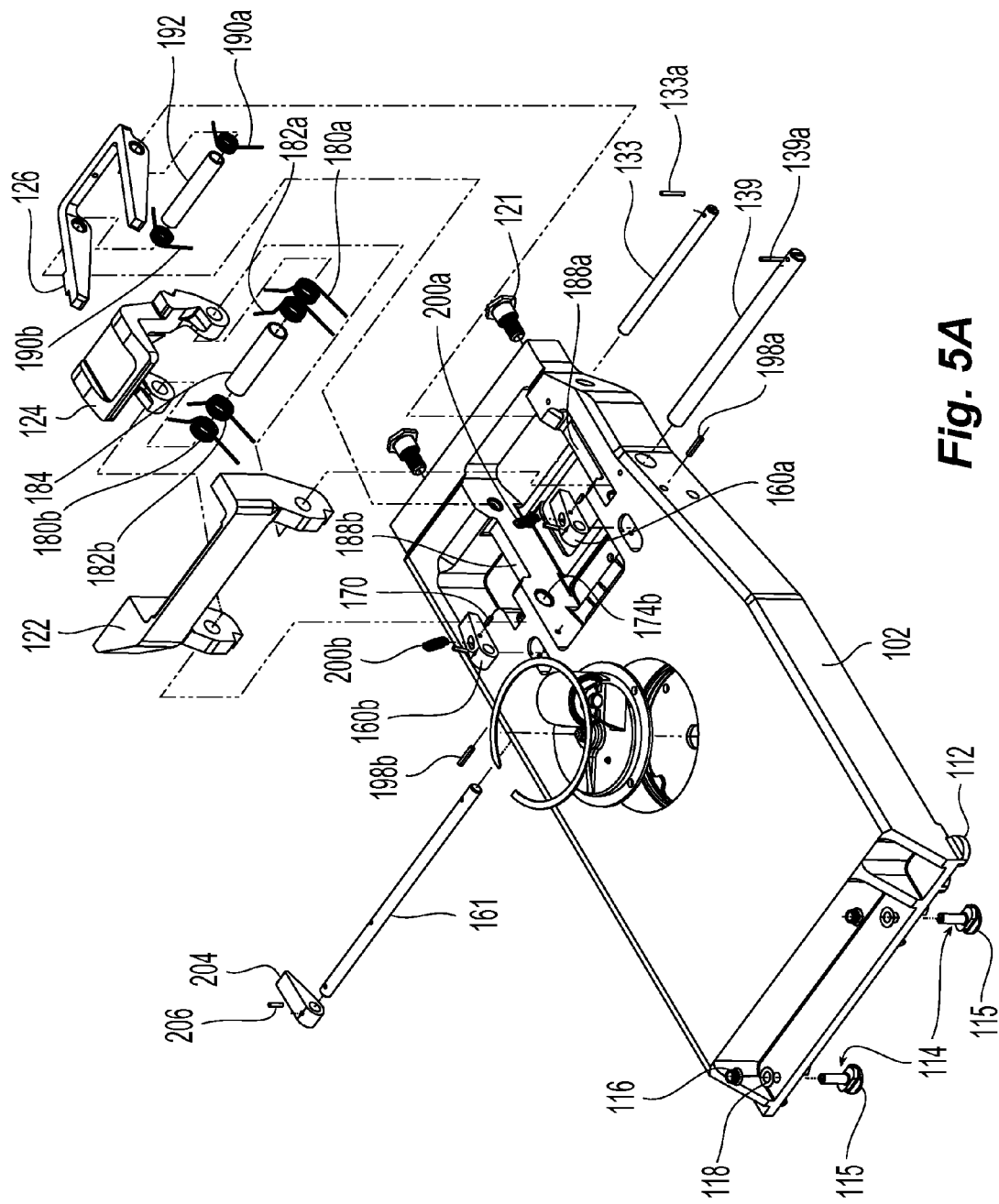
FIG. 5A shows a first exploded view illustrating the assembly of the guide/restraint of FIG. 1.

As seen in FIG. 3A, the U-shaped lockhead pawl 126 has a pair of pawl legs 128A, 128B which are spaced apart at their inner surfaces by a distance D. The legs 128A, 128B are connected by a cross member 129 having an aperture 127 for receiving ends of lockhead pawl torsions springs 190A, 190B (FIG. 2). Each pawl leg 128A, 128B is provided with a corresponding opening 131A, 131B for rotatably mounting the lockhead pawl 126 on a lockhead pawl shaft 133 (FIG. 5A). The pawl legs 128A, 128B have lower ramping surfaces 123A, 123B, respectively, whose significance is described below with respect to operation of the lockhead 124 and FIGS. 11 and 12. Furthermore, the ends 130A, 130B of the pawl legs 128A, 128B, respectively, serve as abutment surfaces which abut against rearwardly facing surfaces 132 formed in a notch 134 of the lockhead 124 (FIG. 3B). It is these ends 130A, 130B which support the lockhead 124 when the latter is in the upright position of FIGS. 1 and 2. A flange 128C on the side of one leg 128B provides a handle of sorts to facilitate hand or foot operation of the lockhead pawl 126.

As seen in FIG. 3B, the lockhead 124 includes a pair of spaced apart lockhead legs 136A, 136B in which a pair of openings 137A, 137B, respectively, are formed. The openings 137A, 137B permit the lockhead 124 to be rotatably mounted on a lockhead shaft 139 (FIG. 5A). The lockhead's spaced apart legs 136A, 136B are connected by an upper lockhead body 138 terminating in a forwardly projecting lock 140. It is the underside surface 140A of the lock 140 which, when upright during flight, is juxtaposed against a lip or other formation on an ULD, thereby retaining such ULD in place. The transverse width W of the lock 140 is narrower than spacing D between the legs 128A, 128B of the lockhead pawl 122. Upper portions of the lockhead's legs 136A, 136B are provided with shoulders 135A, 135B (only one being shown in FIG. 3B). As seen in FIG. 3B, the shoulders 135A, 135B each are provided with a beveled surface 141 proximate the front side of the lockhead body 138. The lower portion of the body 138, on a front side thereof, is provided with a pair of channels 143A, 143B configured to accommodate ends of outer torsion springs 180A, 180B, which bias the lockhead 124 towards the retracted (down) position.

Figure 3C:
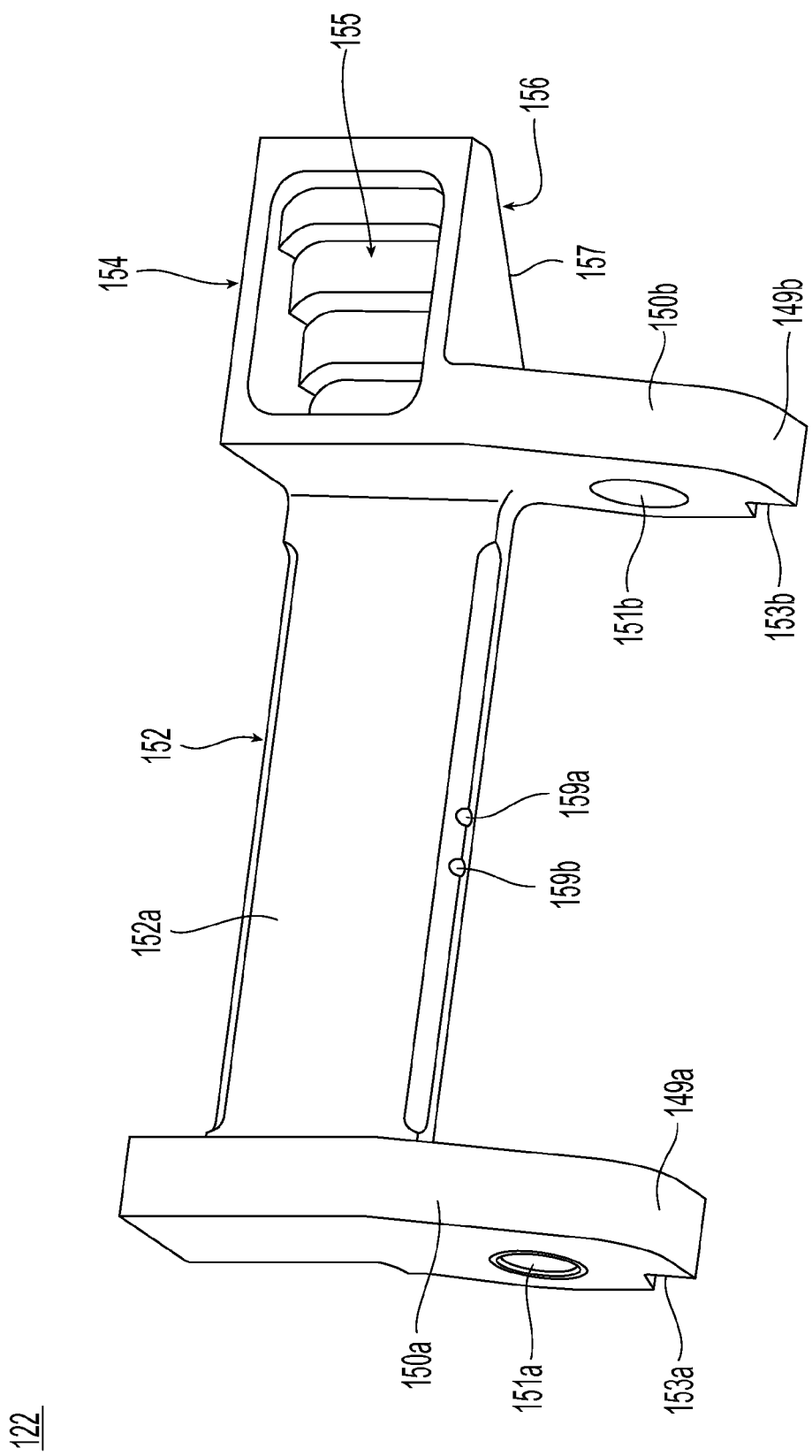
FIG. 3C shows a rotatable guide which serves as the main guide.

As seen in FIG. 3C, the rotatable guide 122 has a pair of spaced apart guide legs 150A, 150B connected by a guide cross member 152 having a backside 152A and a front side 152B (FIG. 1). The lower portion of the guide cross member 152 is provided with a pair of apertures 159A, 159B into which ends of inner torsion springs 182A, 182B are inserted to bias the guide 124 towards the retracted (down) position. Thus, both the guide 122 and the lockhead 124 are normally biased toward the retracted position in which they recline in the recesses 170, 172, described below.

The guide legs 150A, 150B are provided with openings 151A, 151B, respectively, which permit the guide 122 be rotatably mounted on the lockhead shaft 139 (FIG. 5A). Thus, the guide 122 and the lockhead 124 are coaxially mounted and, in the embodiment shown, are mounted on and share the common lockhead shaft 139. The lockhead legs 136A, 136B are spaced apart by a first distance that is smaller than a second distance between the guide legs 150A, 150B. Accordingly, in the guide/restraint 100, the lockhead legs 136A, 136B are nested between the guide legs 150A, 150B along the lockhead shaft 139.

Figure 14:
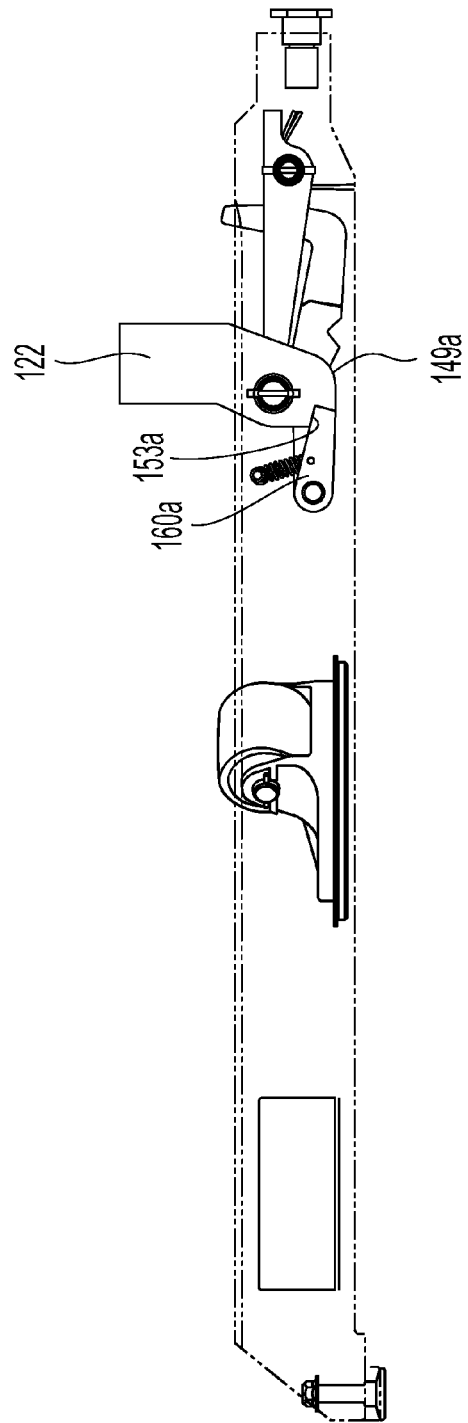
FIG. 14 shows a side view of the embodiment of FIG. 10.

At their lowermost portion, the guide legs 150A, 150B are provided with forwardly facing cutouts 153A, 153B, respectively. As discussed further below, when the rotatable guide 122 is the upright position, the cutouts 153A, 153B are engaged by spaced apart, upwardly biased guide pawls 160A, 160B (FIGS. 6, 10 & 14), respectively, which are mounted on a guide pawl shaft 161 and secured thereto by guide pawl shaft pins 163. The lower portions of the guide legs 150A, 150B, on their back sides, are provided with curved abutment surfaces 149A, 149B, respectively. As discussed further below with respect to FIG. 8, these abutment surfaces 149A, 149B abut and move along riding surfaces of the upwardly biased guide pawls 160A, 160B, when the guide 122 is adjusted from the retracted position to the upright position.

Attached to an upper portion of guide leg 150B is an outwardly extending, wedge-shaped guide head 154. The guide head 154 has a rearwardly facing hollow back side 155 and a rearwardly beveled front side 157. The forwardly facing front side 152B of the cross member 152, and the rearwardly beveled front side 157 of the guide head 156 together form a continuous guide abutment surface 158 for guiding ULDs, when the guide head 156 is in the upright position (FIG. 1).

Figure 4:
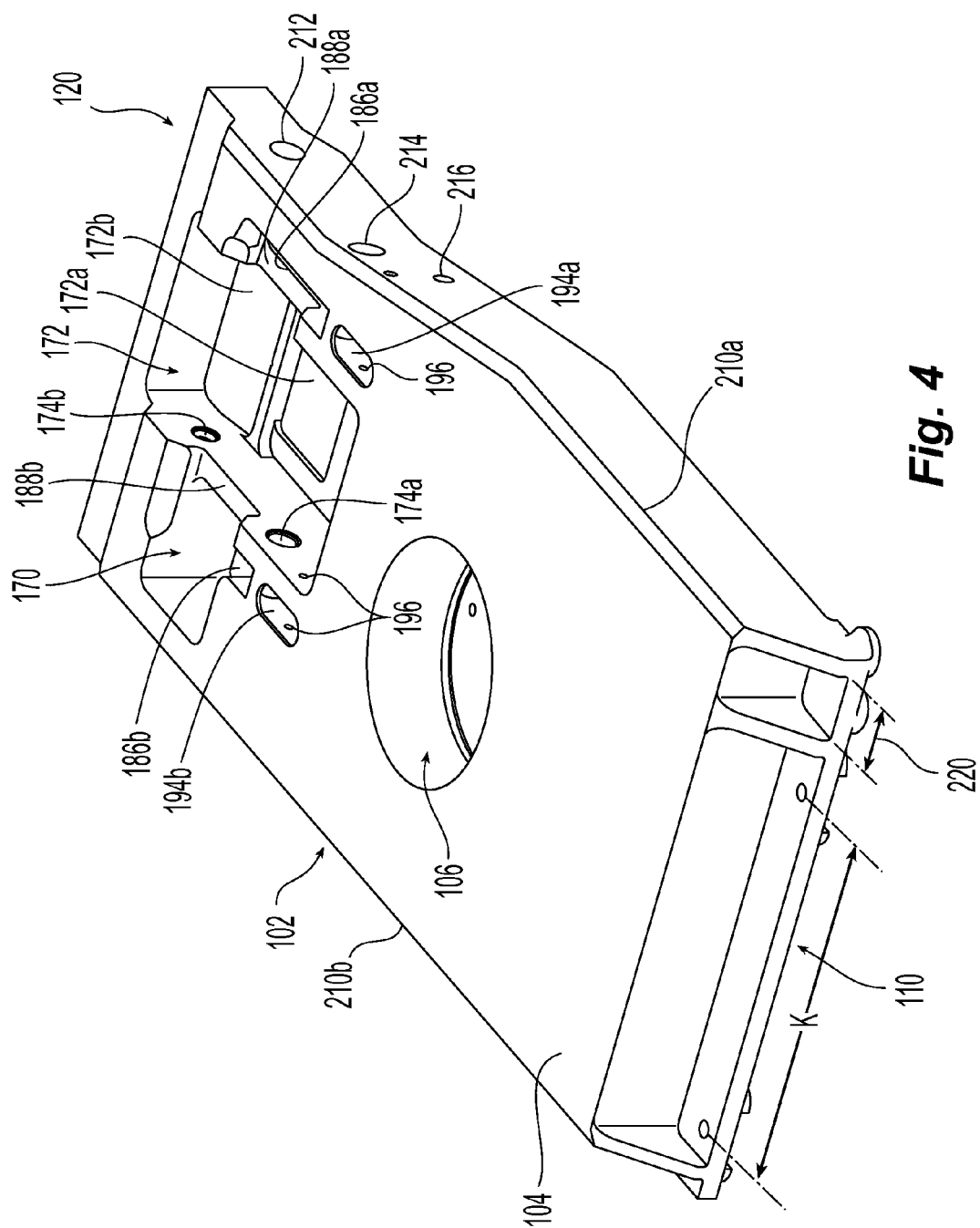
FIG. 4 shows the base of the guide/restraint of FIG. 1.

As seen in FIGS. 1 and 4, the guide/restraint 100 includes a base 102 having a top surface 104. Formed in the top surface 104 of the base 102 is a circular recess 106 for accommodating a roller-type caster 108. The caster 108 is positioned between the guide 122 and a first, or 'inboard' end 110 of the base 102. The caster 108 is itself mounted on a swiveling base, allowing it to pivot and self-align with an ULD passing overhead. The caster 108 provides vertical support for a bottom of a passing ULD to help eliminate sagging ULD edges.

The first or 'inboard' end 110 of the base 102, at lower portion thereof, is provided with integrally formed shear bosses 112 and spring biased tension studs 114 having an elongated lower portion 115 (FIG. 5A). The shear bosses 112 and the tension studs 114 are configured to engage a seat track 410, as discussed further below. Tension stud nuts 116 and washers 118 (FIGS. 5A & 5B) maintain the tension studs 114 in place. The tension studs 114 are spaced apart by a distance K, and define the transverse extent of the guide/restraint's load span.

As seen in FIG. 2, the second or 'outboard' end 120 of the base 102 is provided with openings 119 into which removable shoulder bolts 121 may be inserted, for securely attaching the guide/restraint 100 to a lock tray, as discussed further below. Thus, in this embodiment, opposite ends 110, 120 of the base 102 are provided with different types of fixation devices 114, 121 for attaching to dissimilar retaining devices mounted on an air cargo deck.

As seen in the embodiment of FIG. 4, the axially extending long sides 210A, 210B of the base are not parallel to one another, although this is not a requirement of the present invention. In the embodiment shown, one side 210A is provided with a gusset 220 which widens a portion of the base proximate the inboard end 110 where the shear bosses 112 are located. Providing such a gusset 220 helps distribute a vertical load applied to the guide/restraint 100 via shear bosses 112. The shear bosses 112 are outside the load span K (FIG. 1) defined by the spacing between tension studs 114, and so a vertical load may be directed to positions outside the normal load span K.

Again with reference to FIG. 4, the top surface 104 of the base 102 also includes a pair of recesses 170, 172 proximate the outboard end 120. Of these, recess 172 has a forward recess portion 172A and a rearward recess portion 172B.

Figure 7:
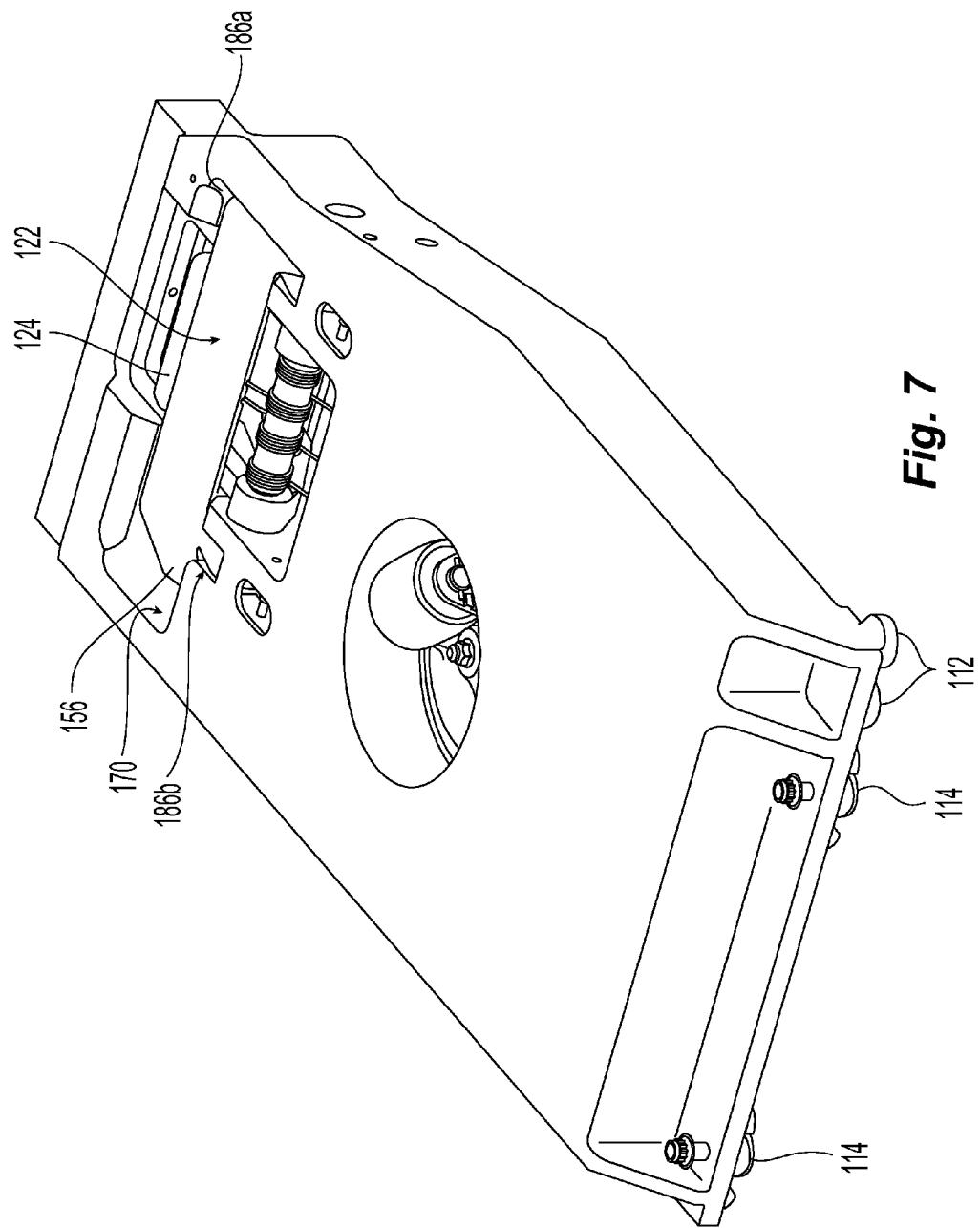
FIG. 7. shows a front perspective view of the embodiment of FIG. 1, with the guide and lockhead both in the retracted position.

As seen in FIG. 7, recess 170 is configured to receive the wedge-shaped guide head 156, when the guide 122 is in the retracted position.

With reference to FIGS. 4, 5A, 5B and 6, the forward recess portion 172A accommodates the lockhead legs 136A, 136B (best seen in FIG. 3B), the lockhead shaft 139, and a lockhead sleeve 184 mounted on the lockhead shaft 139. The forward recess portion 172A also accommodates two pairs of torsion springs which are mounted on the lockhead sleeve 184. The two pairs of torsion springs include a first inner pair 182A, 182B configured to bias the guide 122 towards the retracted position, and a second outer pair 180A, 180B configured to bias the lockhead 124, also towards the retracted position.

In the embodiment shown, the guide legs 150A, 150B (FIG. 3C) are accommodated in narrow slots 186A, 186B located on either side of the forward recess portion 172A and separated therefrom by intermediate recess walls 188A, 188B, respectively. Slot 186B communicates with guide head recess 170. As seen in FIG. 4, the forward recess portion 172A, on a first sidewall thereof, has a forward journalled opening 174A for supporting the lockhead shaft 139. The opposing second sidewall (hidden in FIG. 4) of the forward recess portion 172A has a similar forward journalled opening (also hidden in FIG. 4).

A first pair of bushings 183A, 183B are positioned in the lockhead leg openings 137A, 137B, respectively, to facilitate rotation of the lockhead 124. Meanwhile, a second pair of bushings 185A, 185B are positioned in the guide openings 151A, 151B, respectively, to facilitate rotation of the guide 122. A lockhead shaft securing pin 139A is used to ensure that the lockhead shaft 139 stays in place.

Figure 5B:
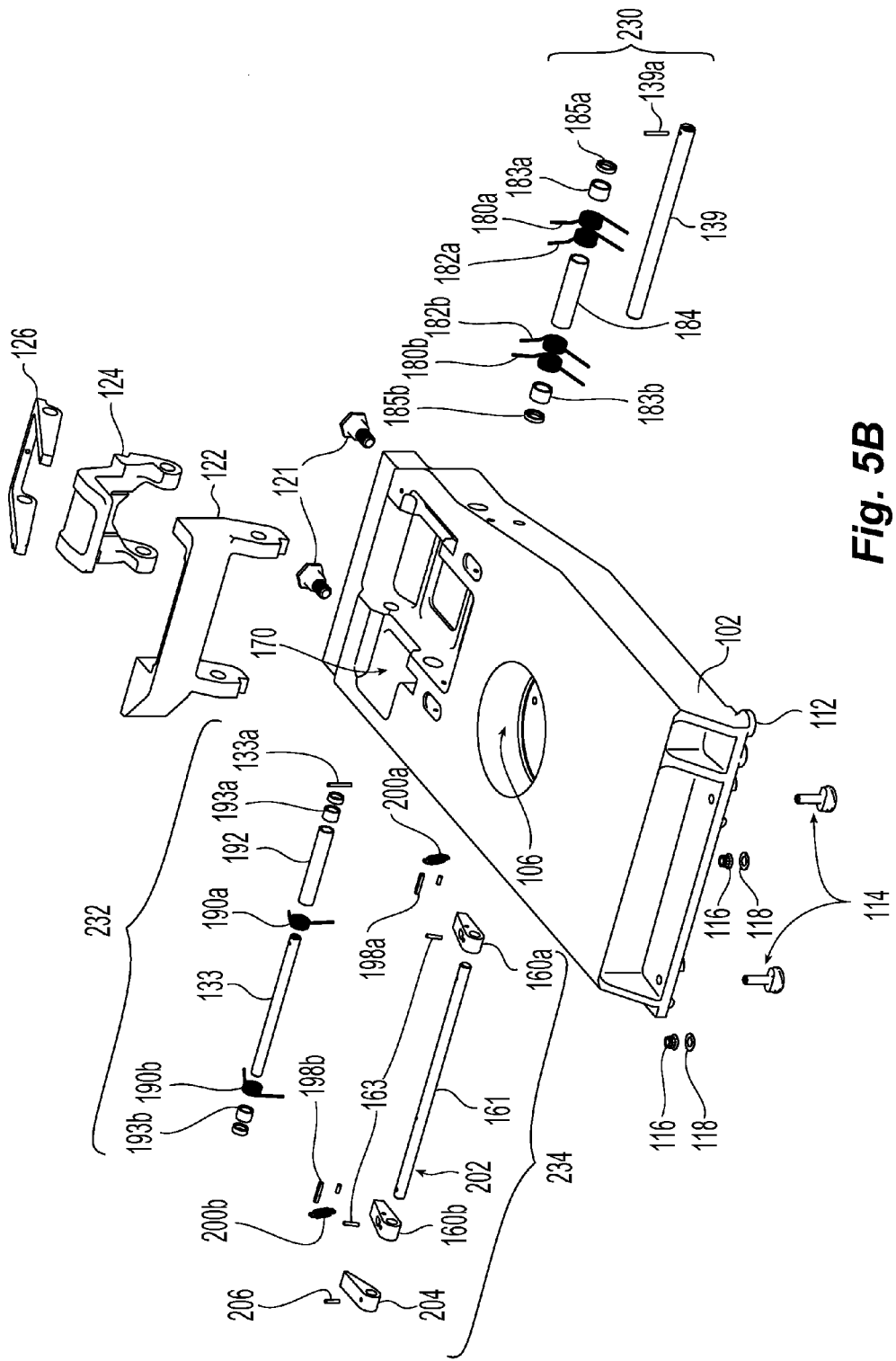
FIG. 5B shows a second exploded view illustrating clusters of components belonging to shaft and pin assemblies around which the guide, the lockhead, the lockhead pawl and the guide pawls rotate.

The lockhead shaft 139, the lockhead shaft securing pin 139A, the lockhead sleeve 184, the inner and outer pairs of torsion springs 182A, 182B and 180A, 180B, respectively, and the first and second pairs of bushings 183A, 183B and 185A, 185B, respectively, together form a lockhead shaft assembly 230 (FIG. 5B).

Again with reference to FIGS. 4, 5A and 6, the rearward recess portion 172B accommodates the pawl legs 128A, 128B, the lockhead pawl shaft 133, and a lockhead pawl sleeve 192 mounted on the lockhead pawl shaft 133. The rearward recess portion 172B also accommodates a pair of lockhead torsion springs 190A, 190B which are mounted on the lockhead pawl sleeve 192, and downwardly biases the lockhead pawl 126. As seen in FIG. 4, the rearward recess portion 172B, on a first sidewall thereof, has a rearward journalled opening 174B for supporting the lockhead pawl shaft 133. The opposing second sidewall (hidden in FIG. 4) of the forward recess portion 172A has a similar forward journalled opening (also hidden in FIG. 4).

A pair of bushings 193A, 193B (FIG. 5B) are positioned in the lockhead pawl openings 131A, 131B (FIG. 3A), respectively, to facilitate rotation of the lockhead pawl 126 around the lockhead pawl shaft 133. A lockhead pawl shaft securing pin 133A is used to ensure that the lockhead pawl shaft 133 stays in place.

The lockhead pawl shaft 133, the lockhead pawl shaft securing pin 133A, the lockhead pawl sleeve 192, the lockhead torsion springs 190A, 190B, and the bushings 193A, 193B together form a lockhead pawl shaft assembly 232 (FIG. 5B).

As best seen in FIG. 4, the top surface 104 of the base 102 is also provided with a pair of openings 194A, 194B for receiving the guide pawls 160A, 160B which, as stated above, are mounted on the guide pawl shaft 161. The sidewalls within each of the openings 194A, 194B are provided with pairs of opposing apertures 196 for supporting horizontally aligned tension spring pins 198A, 198B. The tension spring pins 198A, 198B, in turn, each support one end of a tension spring 200A, 200B, respectively. The second ends of the tension springs 200A, 200B are anchored in an aperture (FIG. 6) formed within the guide pawls 160A, 160B, respectively.

The axis of the guide pawl shaft 161 is offset relative to the axes of the directions in which the guide pawls 160A, 160B are upwardly biased. Therefore, the tension springs 200A, 200B urge the guide pawl shaft 161 to rotate in the direction indicated by the rotational arrow R, as shown in FIG. 6.

Figure 6:
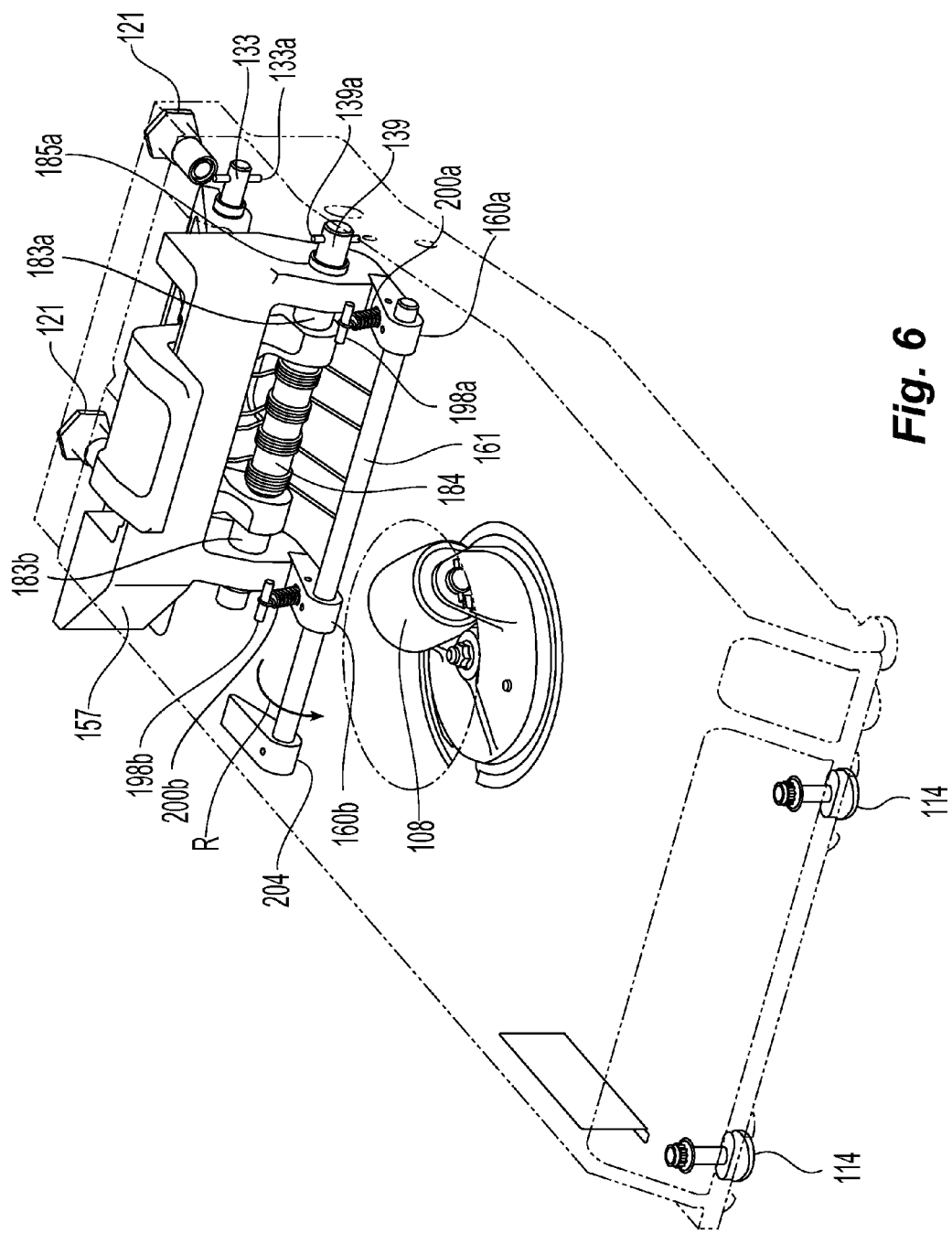
FIG. 6 shows a view of FIG. 1 with the base seen in phantom.

As seen in FIGS. 2 and 6, a first end 202 of the guide pawl shaft 161 is provided with a manually operable release handle 204. The release handle 204 is secured to the guide pawl shaft 161 via a release handle pin 206. The guide pawl shaft 161, the release handle 204, the guide pawls 160A, 160B, the tension springs 200A, 200B, and the various pins associated with each of these, together form a guide pawl shaft assembly 234 (FIG. 5B).

As best seen in FIG. 4, a long side 210A of the base 102 is provided with a number of apertures 212, 214 and 216. Aperture 212, which has a mate 222 on the opposite long side 210B of the base 102 (FIG. 2), permits the insertion of the lockhead pawl shaft 133 and other members of the lockhead pawl shaft assembly 232. Aperture 214, which also has a mate 224 on the opposite long side 210B of the base 102 (FIG. 2), permits the insertion of the lockhead shaft 139 and other members of the lockhead shaft assembly 230 (FIG. 5B). Lastly, aperture 216, which also has a mate (not seen) on the opposite long side 210B of the base 102, permits the insertion of the guide pawl shaft 161.

Figure 8:
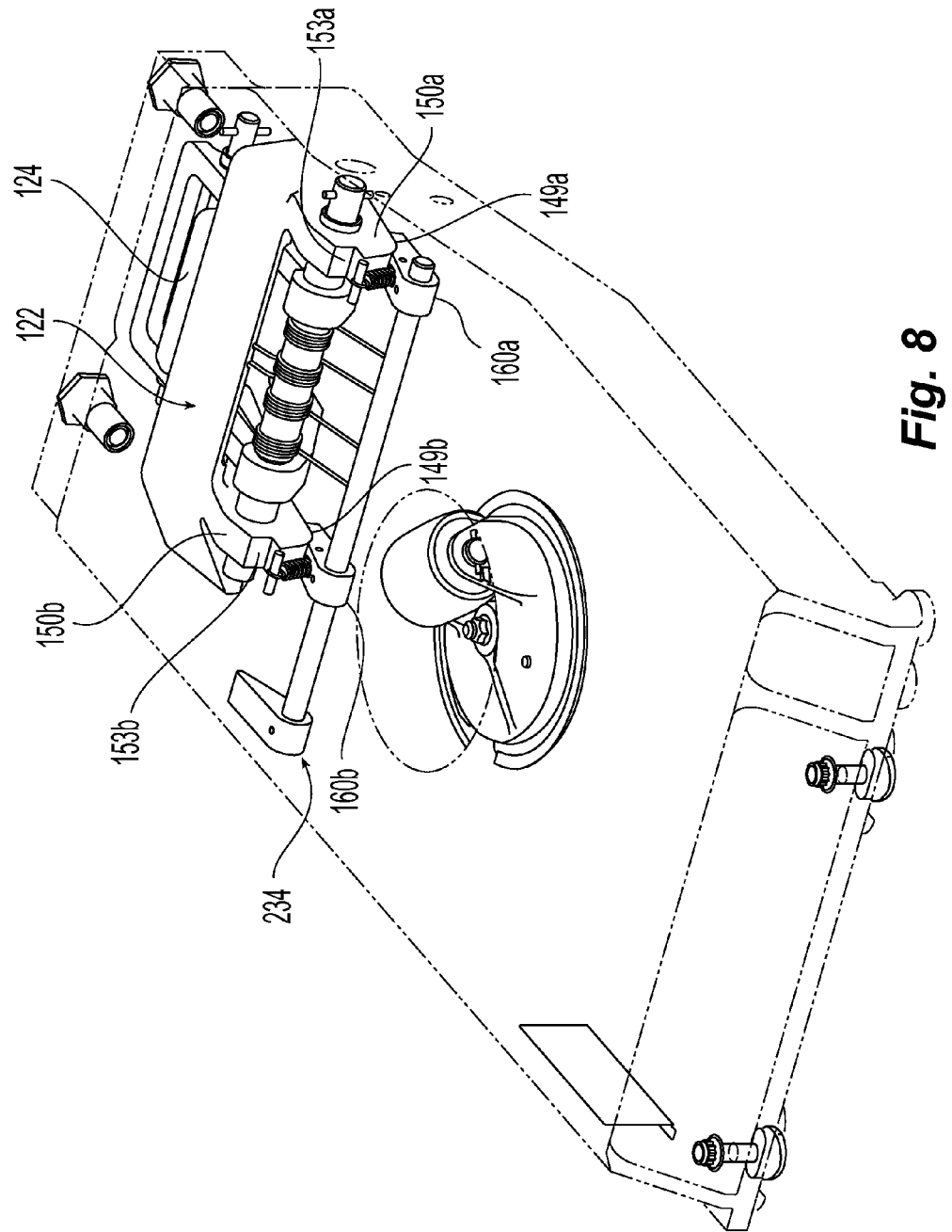
FIG. 8. shows a view of FIG. 7 with the base seen in phantom.
Figure 9:
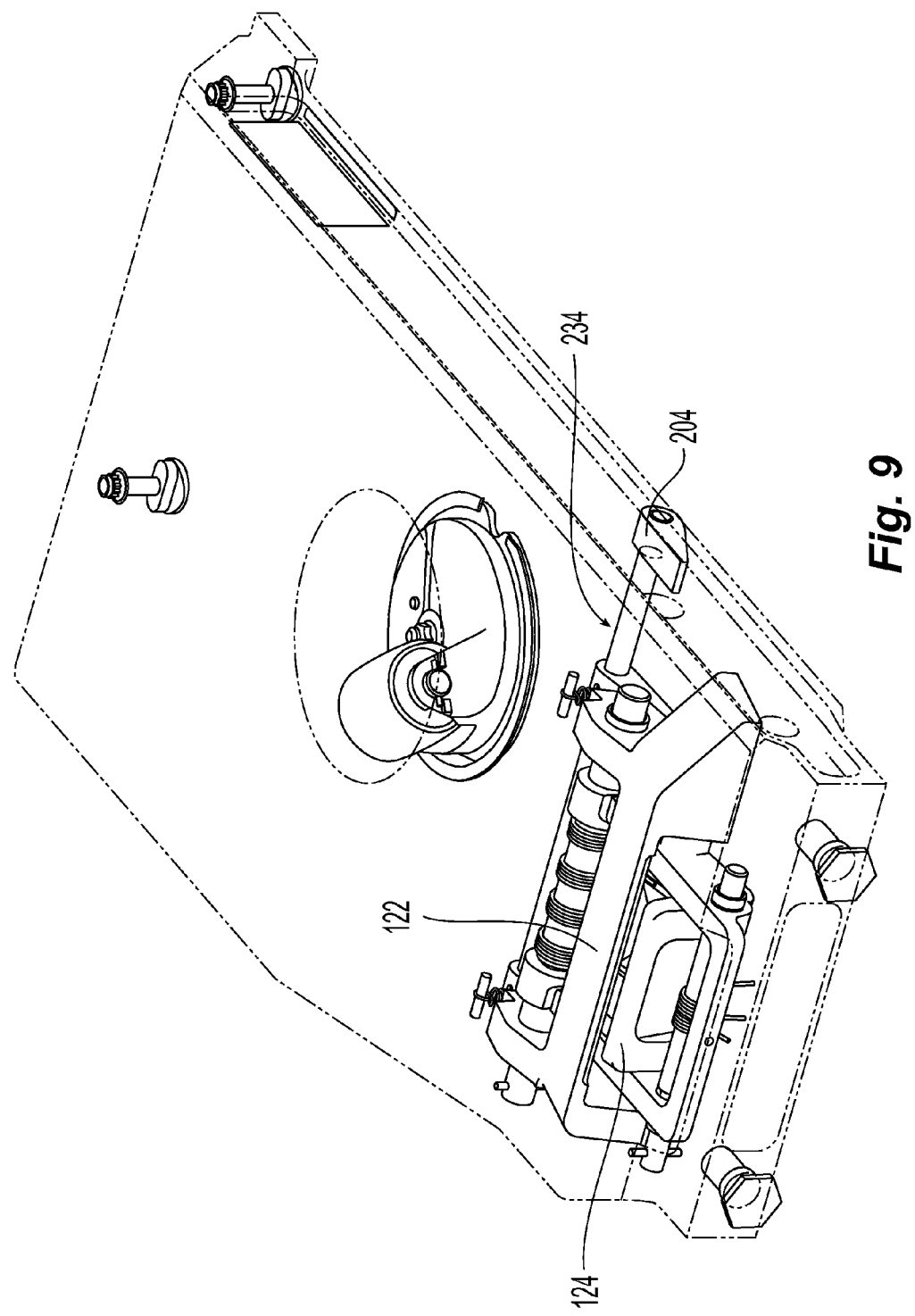
FIG. 9. shows a rear perspective view the guide/restraint of FIG. 7 with the base seen in phantom.

Operation of the guide/restraint 100 is explained next. FIG. 7 shows the guide/restraint 100 with both the guide 122 and the lockhead 124 in the retracted position. FIG. 8 shows a view similar to FIG. 7, but with the base shown in phantom. With the guide/restraint 100 deployed on a cargo deck and the guide 122 and the lockhead 124 both in the retracted position, an ULD may travel along a transport plane of the cargo deck, above the retracted guide 122 and lockhead 124. As best seen in FIG. 9, the guide 122 overlies the lockhead 124 when both are in the retracted position. Thus, the guide 122 must first be rotated to the upright position (FIG. 10 and FIG. 11) before the lockhead 124 can be rotated. In other words, the lockhead 124 can be rotated from the retracted position to the upright position only if the guide 122 is also rotated from the retracted position to the upright position at the same time, or, if the guide 122 is already in the upright position (FIG. 10 and FIG. 11).

Figure 13:
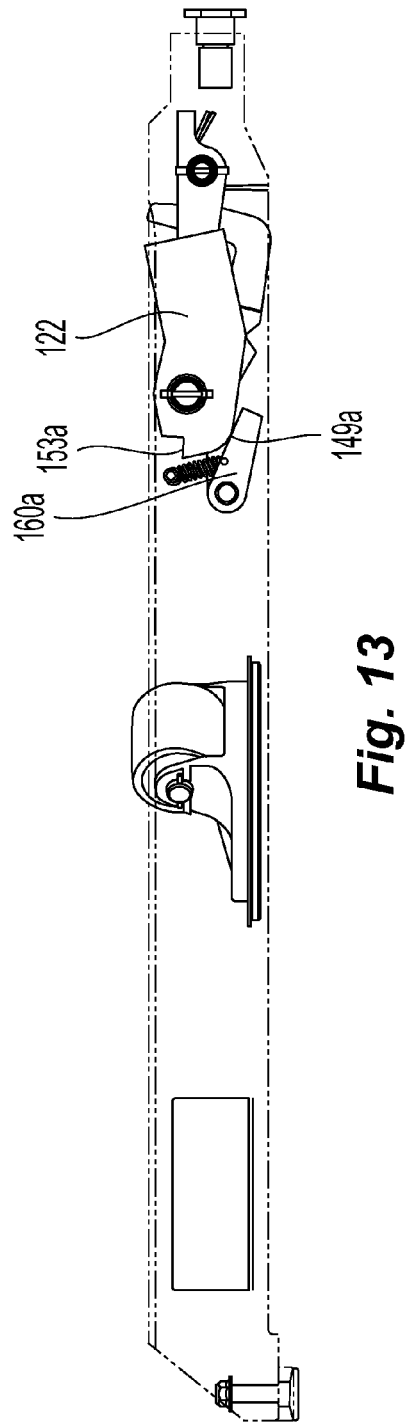
FIG. 13 shows a side view of the embodiment of FIG. 8.

As seen in FIGS. 8 and 13, when the guide 122 is in the retracted position, curved abutment surfaces 149A, 149B (FIG. 3C) formed on the back side of the guide legs 150A, 150B, respectively, abut and rest upon forward portions of the upwardly biased guide pawls 160A, 160B. As the guide 122 is manually rotated from the retracted position of FIGS. 8 and 13 to the upright position of FIGS. 10 and 14, the lower portion of the guide legs 150A, 150B rotate and the curved abutment surfaces 149A, 149B ride on forward portions of the guide pawls 160A, 160B until the ends of the upwardly biased guide pawls 160A, 160B are received into the forwardly facing cutouts 153A, 153B formed on the guide legs 150A, 150B. Thus, the guide 122 is locked in the upright position by a pair of spaced apart, upwardly biased, guide pawls 160A, 160B, fixedly mounted on the common guide pawl shaft 161.

Figure 10:
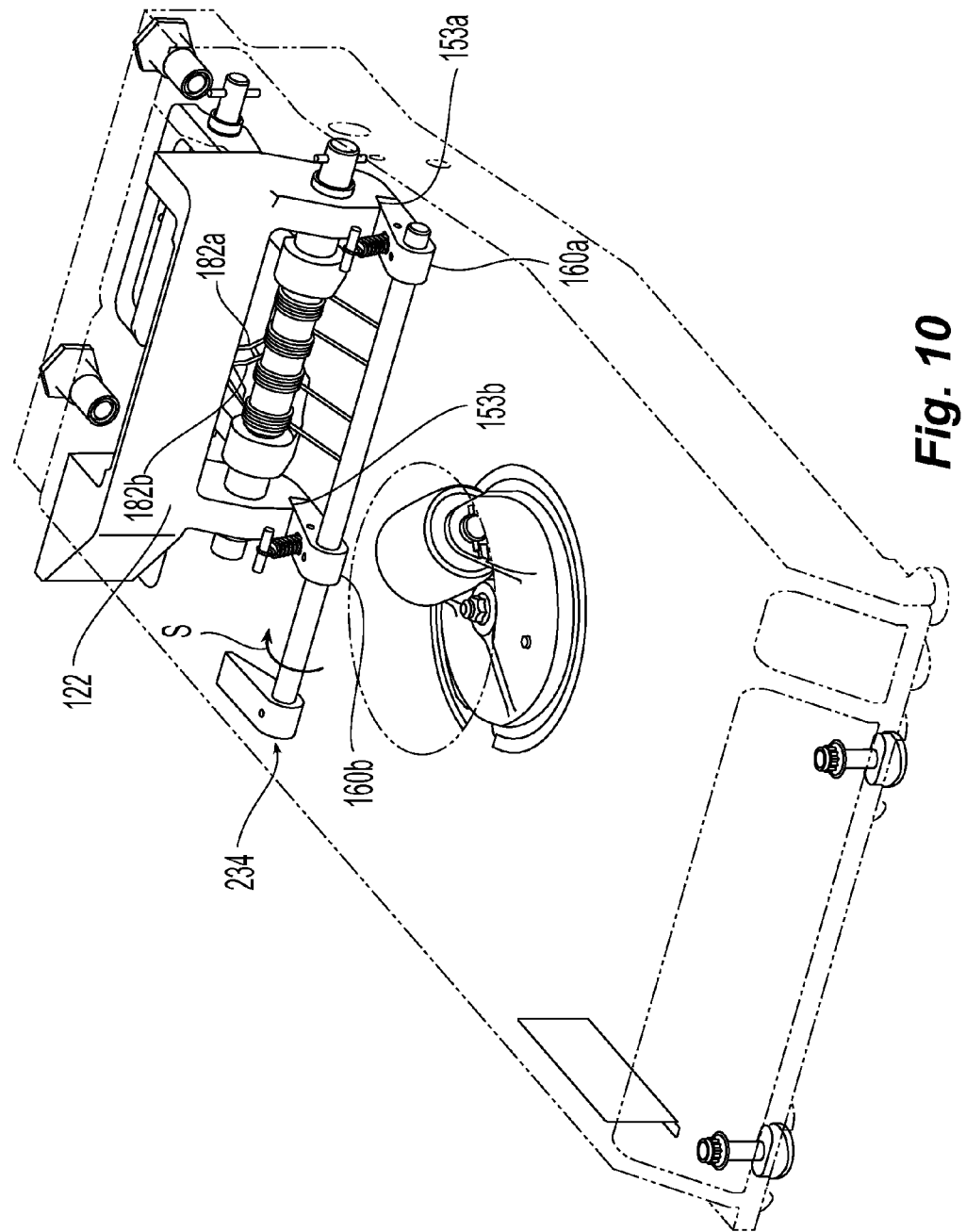
FIG. 10 shows a front perspective view of the embodiment of FIG. 1, with the guide in the upright position, the lockhead in the retracted position and the base in phantom.
Figure 11:
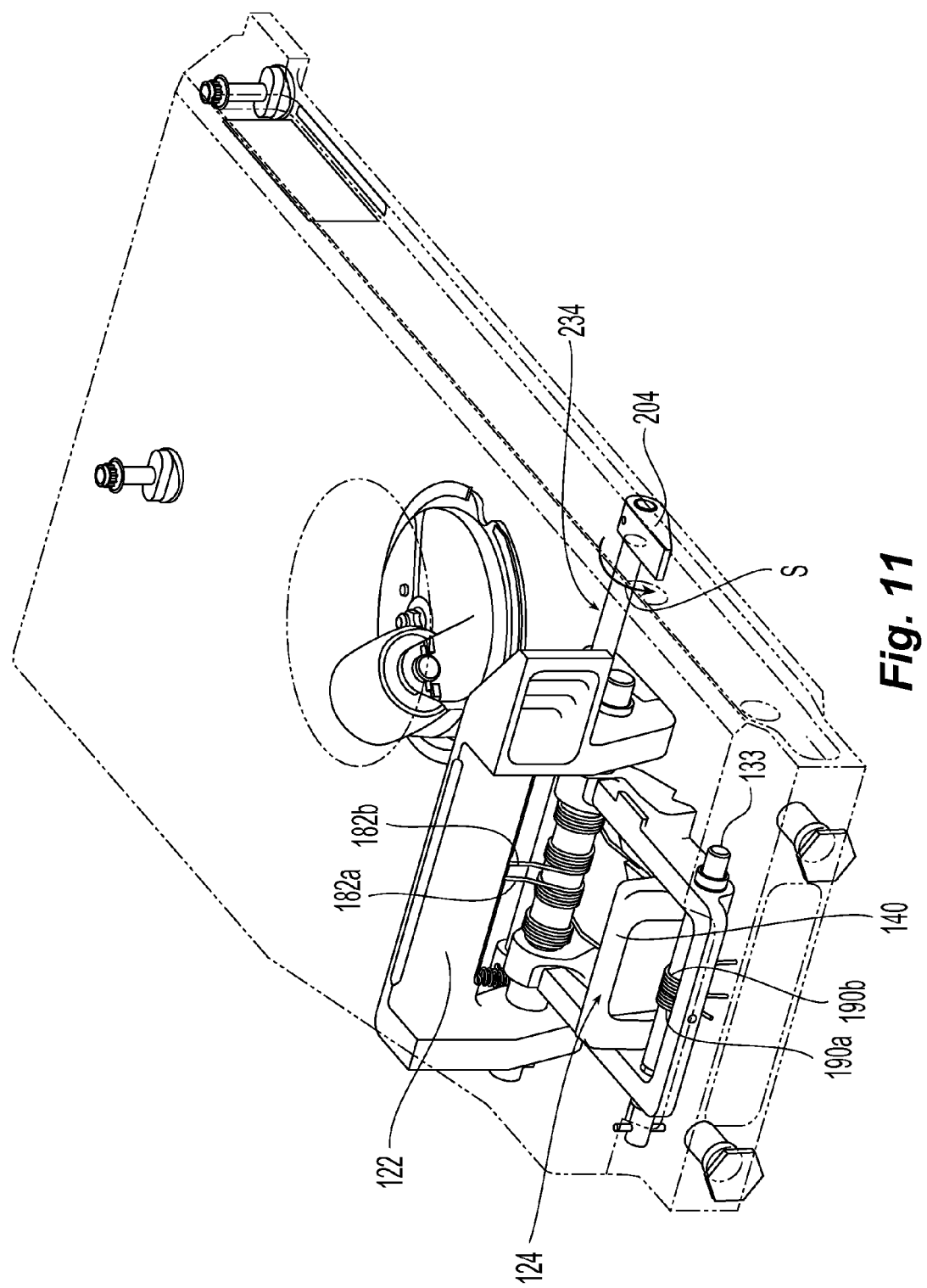
FIG. 11 shows a rear perspective view of FIG. 10

With reference to FIGS. 10 and 11, to return the guide 122 to the retracted position, an operator rotates the release handle 204 of the guide pawl shaft assembly 234 in the direction indicated by the rotational arrow S. This causes the ends of the guide pawls 160A, 160B to disengage from the forwardly facing cutouts 153A, 153B formed on the guide legs 150A, 150B, thereby releasing the guide 122. And since the guide 122 is biased towards the retracted position by the inner springs 182A, 182B, the released guide 122 snaps back to assume the retracted position of FIGS. 8 and 13.

Figure 12:
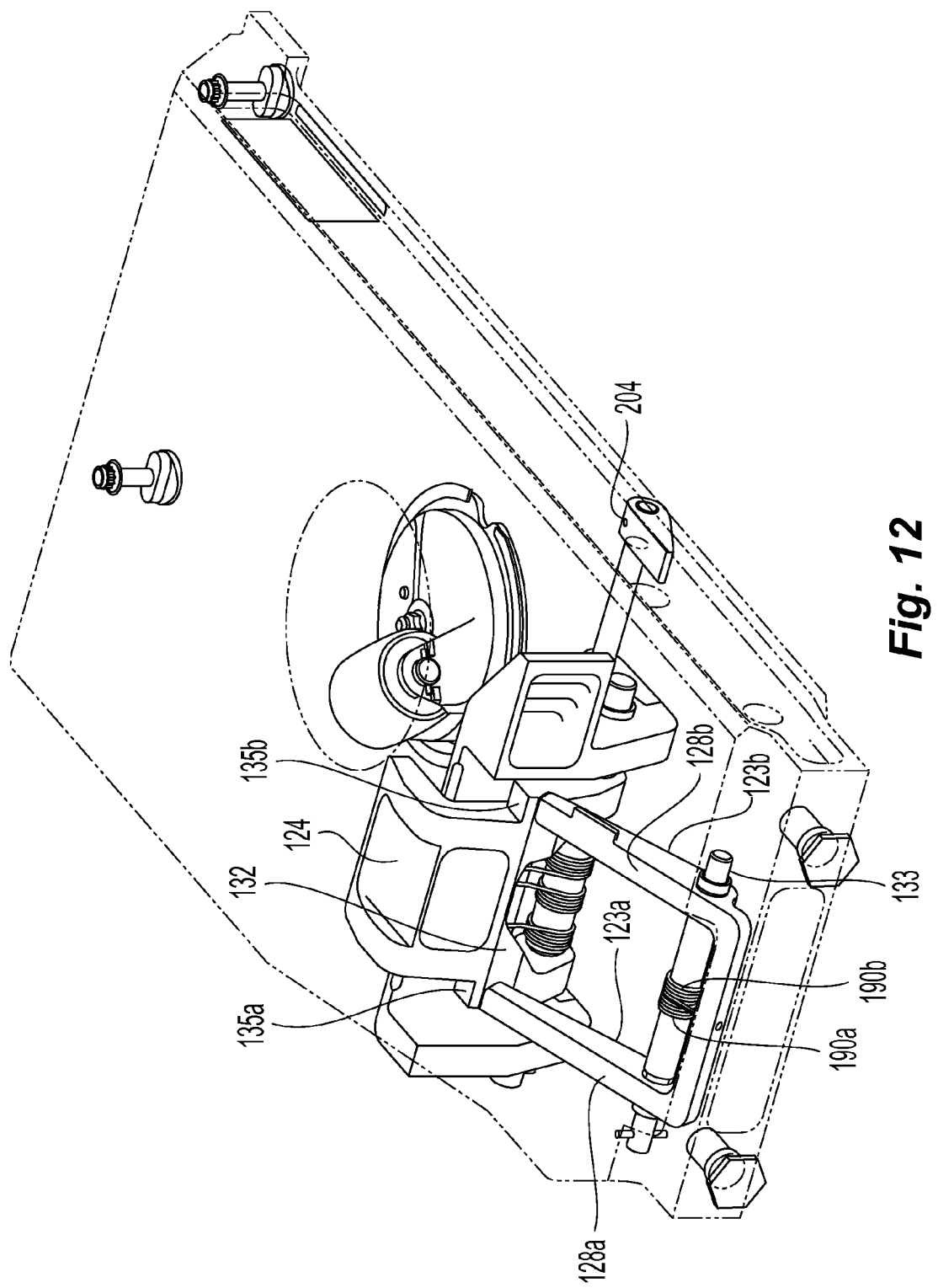
FIG. 12 shows a rear perspective view of the guide/restraint of FIG. 1 with the base seen in phantom, highlighting the operation of the lockhead pawl and lockhead.

With reference to FIGS. 3A, 3B, 11 and 12, the process for adjusting the lockhead 124 from the retracted position to the upright position is now explained. An operator grabs the lock 140 of the lockhead 124 and begins to rotate the lockhead 124 towards the upright position. As this happens, the shoulders 135A, 135B, and especially their beveled surfaces 141 (FIG. 3B) first abut the lower ramping surfaces 123A, 123B on the lockhead pawl's legs 128A, 128B, respectively. As the operator continues to rotate the lockhead 124, its shoulders 135A, 135B travel along the length of the lower ramping surfaces 123A, 123B, rotating the lockhead pawl 126 about its shaft 133 against the biasing force of springs 190A, 190B, and lifting its legs 128A, 128B. As the lockhead 124 is rotated into the fully upright position, the lockhead pawl's legs 128A, 128B slip off the shoulders 135A, 135B, and the end surfaces 130A, 130B fall into place against rearwardly facing surfaces 132 formed in a notch 134 of the lockhead 124. In this manner, the lockhead pawl 126 locks the lockhead 124 in the upright position, as seen in FIG. 12.

As seen in the figures, when both the guide 122 and the lockhead 124 are in the upright position, the lockhead 124 is taller than the guide 122 and the lockhead's lock 140 projects past the forwardmost point of the cross-member 152 of the guide 122 in the forward (or 'inboard') direction. This allows the lock 140 and/or its underside surface 140A to abut or otherwise engage a pocket or other structure formed on a pallet. So, even though the guide 122 is in the upright position, it does not interfere with using the lockhead 124 due to the construction of these two components and also because of their coaxial arrangement.

When both the lockhead 124 and the guide 122 are in the upright position, one must first return lockhead 124 to the retracted position; operating the release handle 204 with the lockhead 124 will not return the guide 122 to the retracted position. To return the lockhead 124 to the retracted position, an operator further rotates the lockhead pawl 126 by foot or by hand, perhaps at the flange 128C, so that the end surfaces 130A, 130B of the lockhead pawl 126 are lifted upwards past the notch 134. Since the outer springs 180A, 180B bias the lockhead 124 towards the retracted position, and the lockhead 124 is no longer supported by the end surfaces 130A, 130B due to the operator's action, the lockhead 124 snaps back into the retracted position, its lock 140 passing between the legs 128A, 128B of the lockhead pawl 126. After the lockhead 124 has been released, the operator then releases the lockhead pawl 126, allowing it to return to the retracted position by virtue of the biasing force of springs 190A, 190B. This results in the guide/restraint 100 being returned to the position seen in FIG. 7.

From the foregoing, it can be seen that when the lockhead 124 is down, the guide 122 is independently operable. Thus, with the lockhead 124 in a retracted position, the guide 122 may be brought to the upright position during loading of a cargo deck to provide guidance for various ULDs. Once a pallet has been loaded, the lockhead 124 may also be brought to an upright position to maintain the pallet in position during flight.

To unload a pallet, the lockheads 124 are first retracted so as to disengage from a pocket, or other structure, provided on the pallet. The guides 122, at least on a first side of the pallet, are then retracted to facilitate removal of the pallet from the cargo deck. In one embodiment, the guides 122 on the opposite side of the pallet may be left in the upright position to facilitate guidance of other ULDs which had been loaded on the cargo deck.

Figure 15A:
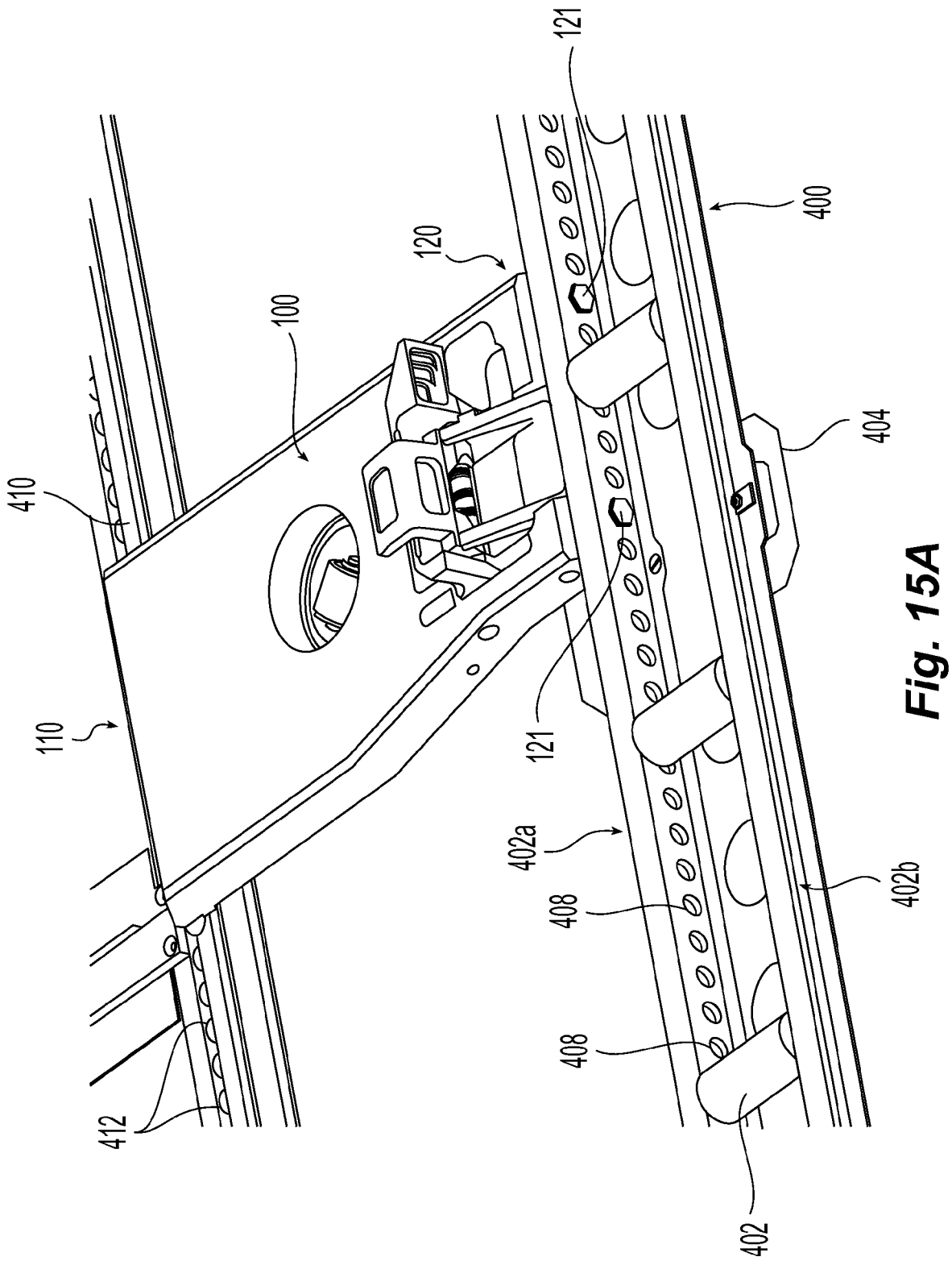
FIGS. 15A and 15B show two perspective views of a guide/restraint secured at one end to a lock tray and at opposite end to a seat track.
Figure 15B:
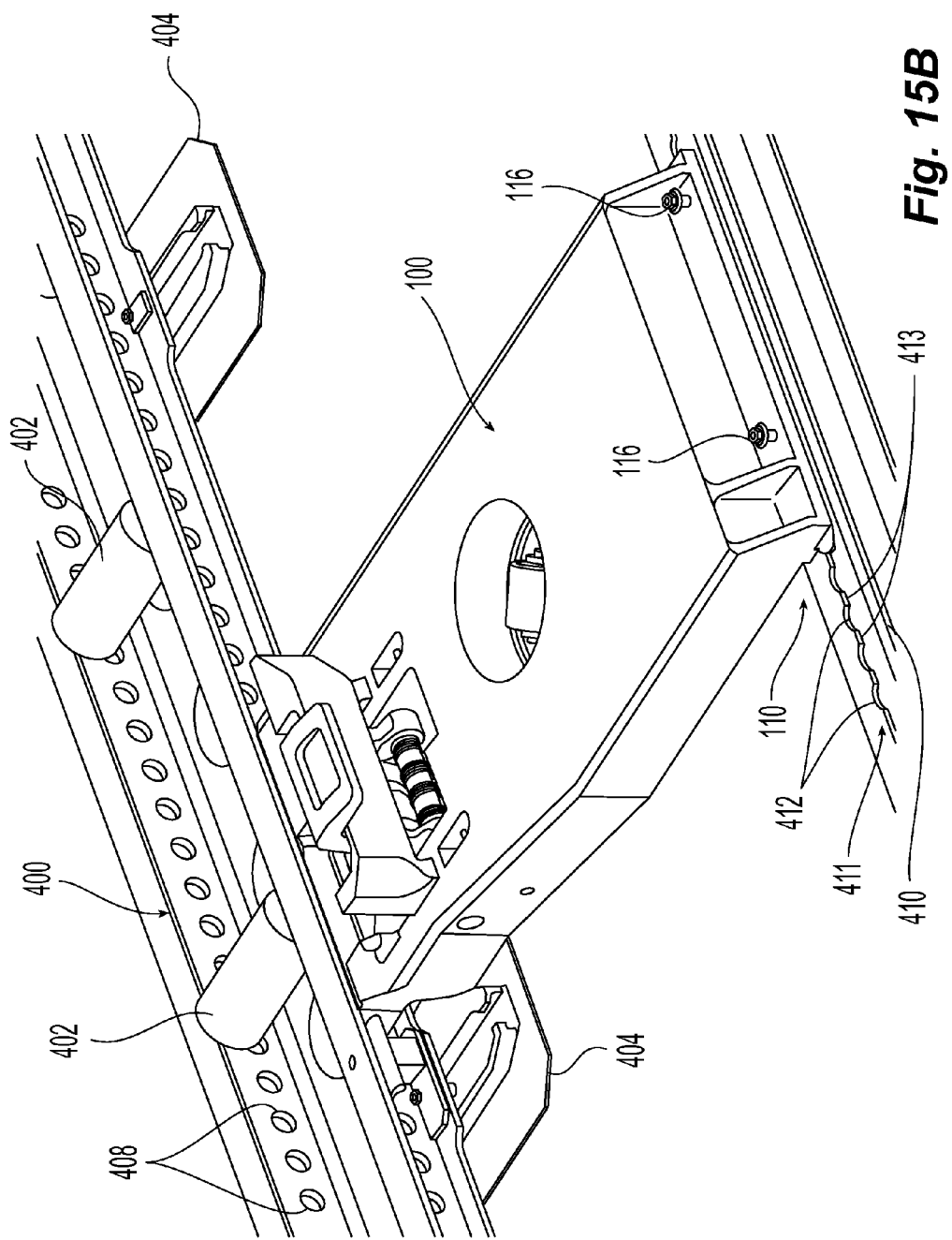

FIGS. 15A and 15B show a guide/restraint 100 secured at the first, or 'inboard' end 110 to a seat track 410 and at the second, or 'outboard' end 120 to a lock tray 400.

As seen in these figures, this particular lock tray 400 is mounted to an air cargo floor fixture 404. The lock tray 400 comprises a pair of parallel rails 402A, 402B. In one embodiment, each rail 402A, 402B is provided with a linear array of holes 408 spaced apart at one inch centers. Rollers 402 supported by these rails 402A, 402B are spaced apart along the length of the lock tray 400.

The outboard end 120 of the guide/restraint 100 is secured to the lock tray 400 by means of the shoulder bolts 121, which are screwed into openings 119 (FIG. 2) formed in the outboard end wall of the guide/restraint 110.

At its inboard end 110, the guide/restraint 100 is secured to the seat track 410 by means of the shear bosses 112 and tension studs 114 (FIG. 1) having tension stud nuts 116. As is known to those skilled in the art, the upper surface of each seat track 410 has a pair of opposing scalloped flanges 411 (only one of the pair being visible in FIG. 15B) forming a row of circular openings 412 connected by narrowed lips 413 (only one lip being visible in FIG. 15B). The tension studs 114 have an elongated lower portion 115 whose width is narrow enough to fit between the narrowed lips 413 of the opposing scalloped flanges 411. In one embodiment, installation is performed by first inserting the shear bosses 112 into the circular openings 412 while simultaneously inserting the lower portion 115 of the tension studs 114, with its long dimension parallel to the length of the seat track 410, between the narrowed lips 413 of the opposing scalloped flanges 411. Then, each tension stud 114 is rotated by a quarter turn, i.e., by 90°, so that the long dimension of its lower portion 115 is transverse to the length of the seat track 410. This results in the tension studs 114 being retained by the undersides of the opposing scalloped flanges 411 of the seat track 410.

It can thus be seen from FIGS. 1, 2, 15A and 15B, that while one end 110 of the guide/restraint 100 is provided with a first type of fixation device (e.g., tensions studs), the opposite second end 120 is provided with an altogether different type of fixation device (e.g., shoulder bolts). This arrangement allows a guide/restraint 100 to be positioned between dissimilar retaining devices, such as lock trays 400 and seat tracks 410, having completely different hardware for mating to a device such as the disclosed guide/restraint 100.

Figure 16:
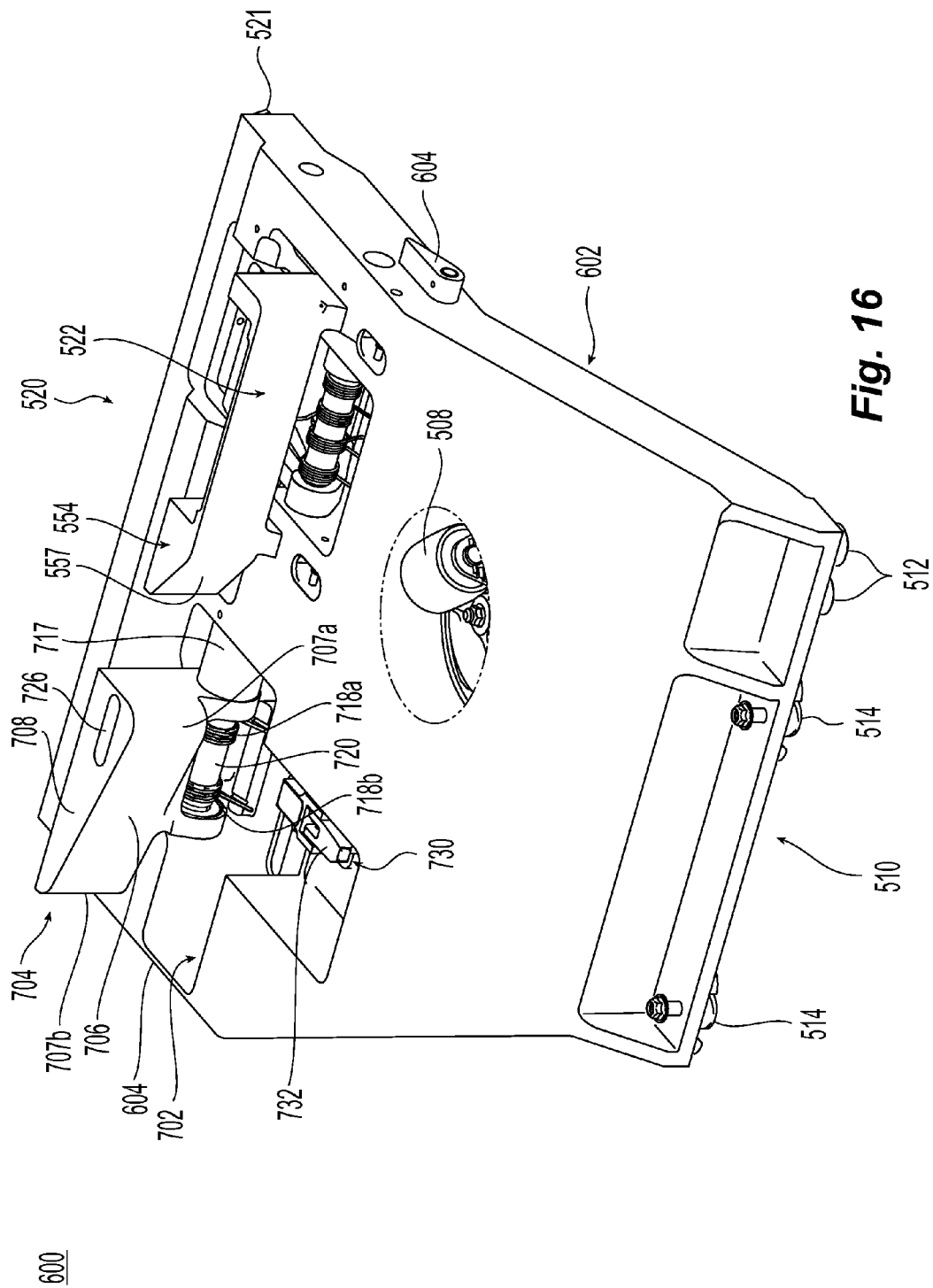
FIG. 16 shows a front perspective view of a second embodiment of a guide/restraint in accordance with the present invention, having an auxiliary guide in the upright position.

FIG. 16 shows a front perspective view of a second type of guide/restraint 600, in accordance with one embodiment of the present invention. This second type of guide/restraint 600 is referred to a "lead-in guide/restraint" because it is designed to be positioned proximate the doorway to the main cargo deck.

The lead-in guide/restraint 600 has a base 602 supporting many of the same, or similar, components seen in the guide/restraint 100 described above. The common components include a caster 508, a guide 522 having a wedge-shaped guide head 554 provided with a rearwardly beveled front side 557, a lockhead 524, a lockhead pawl 526 and a release handle 604 for releasing the guide 522, all of whose operation is similar to that of their counterparts in FIGS. 1-14, described above.

In addition, for mating with other floor-mounted retaining devices, the base 602 is provided with shear bosses 512 and tension studs 514 on a first 'inboard' end 510, and is provided with shoulder bolts 521 on a second 'outboard' end 520. Much like the guide/restraint 100 described above, the shear bosses 512 and tension studs 514 are configured to connect to a seat track, such as seat track 410, while the shoulder bolts 521 are configured to connect to a lock tray, such as lock tray 400.

Figure 17:
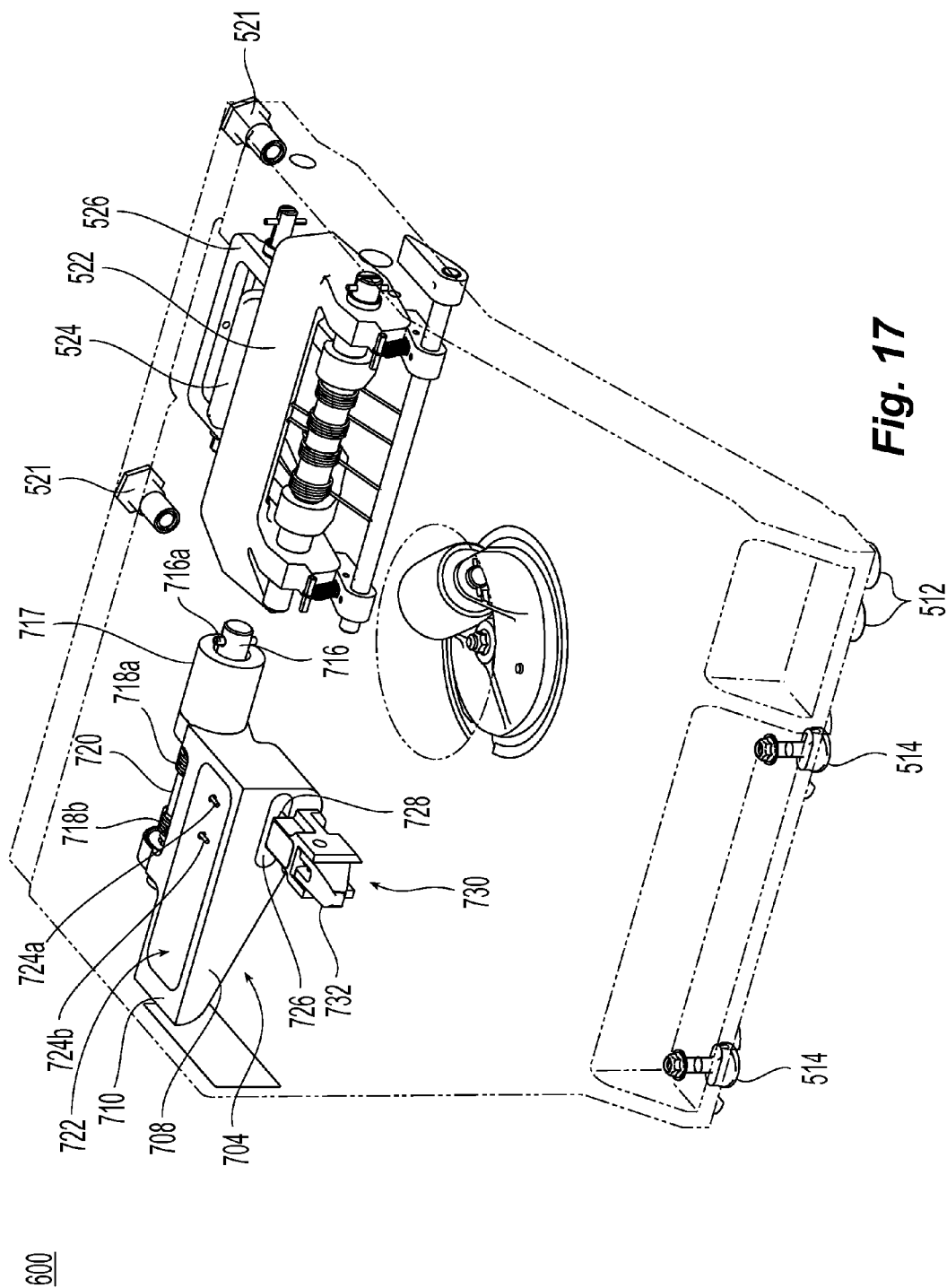
FIG. 17 shows a front perspective view of the guide/restraint of FIG. 16, with the base shown in phantom and the auxiliary guide in the retracted position.
Figure 18:
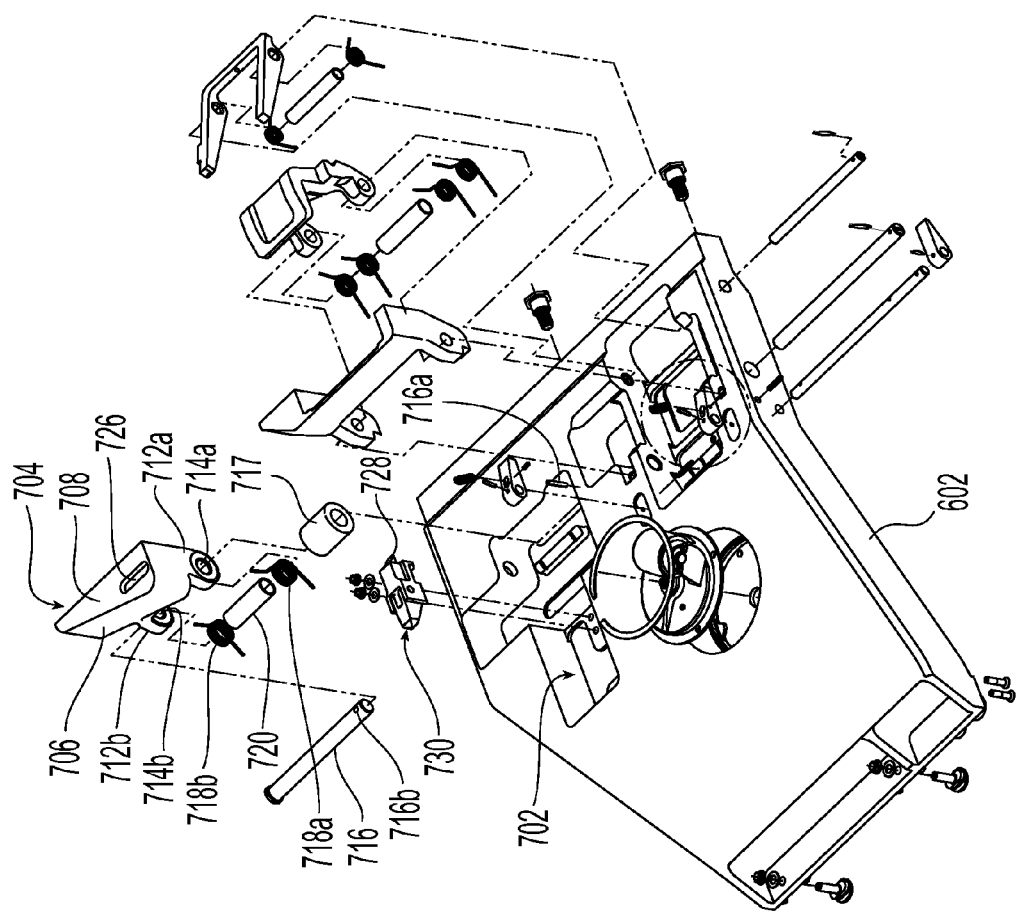
FIG. 18 shows an exploded view of the guide/restraint of FIG. 16.

As seen in FIG. 16 and FIG. 18, the lead-in guide/restraint 600 has an auxiliary recess 702. A wedge-shaped second, or 'auxiliary', guide 704 is mounted in this recess 702. The auxiliary guide 702 comprises an angled front surface 706, a generally triangular top surface 708, a back surface 710 (FIG. 17 and FIG. 19) and a pair of legs 712A, 712B having axially aligned openings 714A, 714B, respectively. With reference to FIG. 17 and FIG. 18, the auxiliary guide 702 is mounted on an auxiliary guide shaft 716 which passes through the axially aligned openings 714A, 714B in the legs 712A, 712B. The auxiliary guide shaft 716 is secured to the base 602 by a securing pin 716A inserted into an traverse aperture 716B formed at one end of the auxiliary guide shaft 716 (FIG. 17).

The auxiliary guide shaft 716 also passes through a spring 717 which is coaxially mounted with the auxiliary guide 704. The spring 717 spaces apart the auxiliary guide 704 from an interior side wall of the auxiliary recess 702. The spring 717 is configured to help mitigate a shock applied to the second guide; when the auxiliary guide is struck by an ULD that is being loaded onto a cargo deck, the spring 717 helps absorb the impact. In one embodiment, the spring 717 is formed from an elastic material, such as polyurethane. In other embodiments, the spring 717 may be a compression spring.

Figure 19:
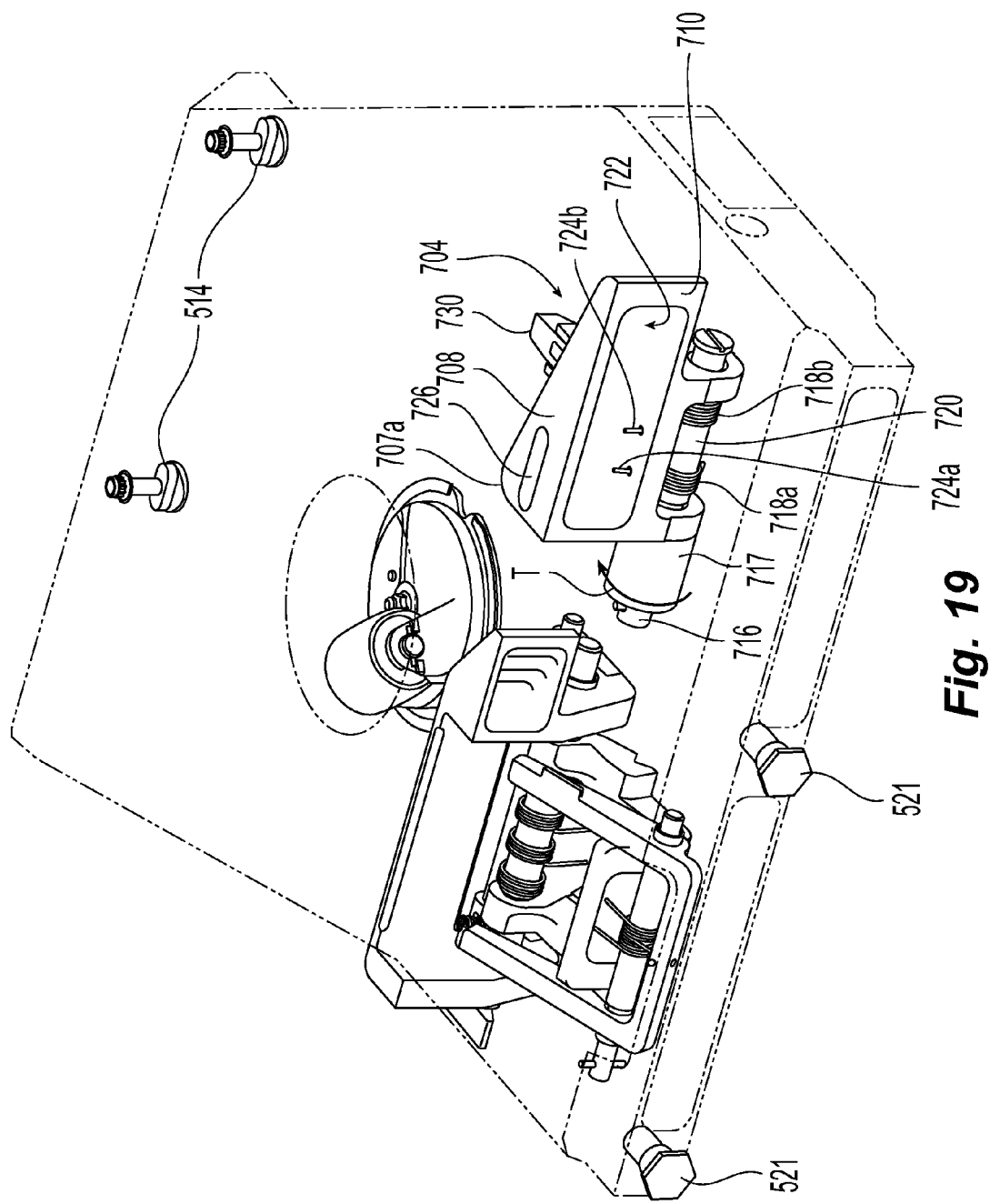
FIG. 19 shows a rear perspective view of the guide/restraint of FIG. 16, with the base shown in phantom and the auxiliary guide in the upright position.

The auxiliary guide 704 can occupy either an upright position (FIG. 16) or a retracted position (FIG. 17). A pair of torsion springs 718A, 718B are mounted on the auxiliary guide pin 716 between the legs 712A, 712B, via an auxiliary sleeve 720. The back surface 710 of the auxiliary guide 704 is provided with a recess 722 into which ends 724A, 724B of the auxiliary springs 718A, 718B, respectively, protrude (FIG. 17 and FIG. 19). The torsion springs 718A, 718B bias the auxiliary guide 704 into the upright position of FIG. 17.

The front surface 706 of the auxiliary guide 704 is rearwardly angled from a forwardmost point 707A near an inner portion of the base 602 to a rearwardmost point 707B proximate a base edge 604. Thus, the front surface 706 of the auxiliary guide 704 is angled in the same direction as the front side 557 of the wedge-shaped guide head 554 belonging to guide 522.

The top surface 708 of the auxiliary guide 704 is provided with a latch recess 726. The latch recess 726 is configured and dimensioned to receive the latch 728 of a release element 730 that is mounted in the floor of the auxiliary recess 702. When the auxiliary guide is in the upright position of FIG. 17 or FIG. 19, an operator may rotate the auxiliary guide 704, against the biasing force of the auxiliary springs 718A, 718B and in the direction indicated by rotational arrow T (FIG. 19), until the latch 728 is captured by the latch recess 726. When the auxiliary guide 704 is in the retracted position of FIG. 16 with the latch 728 captured in the latch recess 726, an operator may manually press the spring loaded latch release 732 to withdraw the latch 728 from the latch recess 726, and thereby allow the torsion springs 718A, 718B to return the auxiliary guide 704 to the upright position of FIG. 17.

The lead-in guide/restraint 600 is suitable for mounting near a doorway, such as a side doorway, of an air cargo main deck. The auxiliary guide 704, and especially the spring 717 adjacent thereto, helps protect the lead-in guide/restraint 600 from high impact loads that may result when an ULD being loaded is not aligned properly as it enters the cargo hold.

Figure 20:
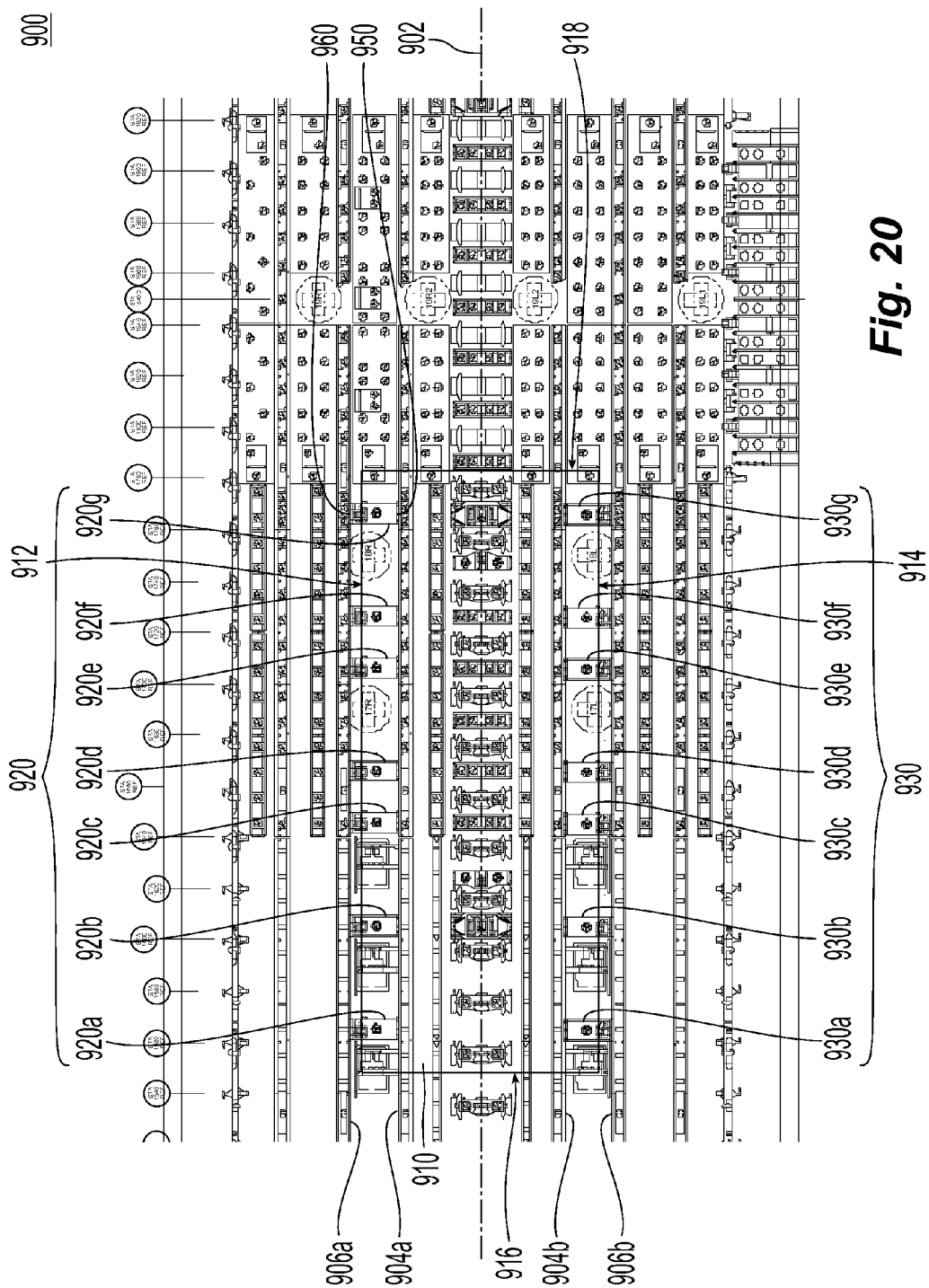
FIG. 20 shows a partial layout of an air cargo deck in which a pallet is loaded along the centerline and retained with guides/restraints in accordance with the present invention.

FIG. 20 shows a partial layout of a Boeing 747 main air cargo deck 900, depicting the centerline 902 of the cargo deck 900 and a 20 foot pallet 910 loaded along the centerline 902 and retained by a plurality of guides/restraints not unlike those seen in FIG. 1. In FIG. 20, the pallet 910 is shown as a rectangular outline defined by a pair of parallel long sides 912, 914, a forward end 916 and an aft end 918.

In one embodiment, the pallet 910 is mounted just aft of the wingbox area of the main cargo deck 900. The wingbox area is an area of the cargo deck 900 which corresponds to the locations on either side of the fuselage where the aircraft's wings are attached. Thus, the wingbox area extends for an axial length along the cargo deck that more or less corresponds to the width of the wings where they attach to the fuselage. In the wingbox area, beneath the cargo deck, are a plurality of spaced apart floor beams, or joists, which extend longitudinally, or lengthwise, along the fuselage. Outside the wingbox area are a plurality of spaced apart weight-bearing floor beams, or joists, which extend transversely, or widthwise, to the fuselage. Generally speaking, the floor beams outside the wingbox area are able to sustain greater lateral loads than the floor beams inside the wingbox area, and so the pallet 910 is preferably loaded outside the wingbox area.

On either side of the centerline 902 are a pair of axially extending seat tracks 904A, 904B. It is understood, however, that additional seat tracks and lock trays, not relevant to the present discussion, may also be present on the cargo deck 900. In an outboard direction (i.e., in a direction away from the centerline 902 and towards the sides of the cargo compartment) from either seat track 904A, 904B is an axially extending roller tray 906A, 906B. The seat tracks 904A, 904B and the roller trays 906A, 906B are parallel to one another. Two parallel rows 920, 930 of guides/restraints extend parallel to, and on opposite sides of, the centerline 902. The guides/restraints connect the seat tracks 904A, 904B to corresponding roller trays 906A, 906B, respectively. In the embodiment shown, the first row 920 includes guides/restraints 920A, 920B, 920C, 920D, 920E, 920F, 920G, while the second row 930 includes guides/restraints 930A, 930B, 930C, 930D, 930E, 930F, 930G.

It is understood that the various guides/restraints 920A-G and 930A-G are similar in construction to guide/restraint 100 described above insofar that each has coaxially mounted guides 122 and lockheads 124 on the outboard end. However, the shape and position of the gussets 220 in each of these guides/restraints 920A-G and 930A-G may differ from one to another so as to properly direct vertical loads, via the shear bosses 112 (FIG. 1), directly into the aforementioned transversely extending, weight-bearing floor beams underlying the cargo deck 900 outside the wingbox area. Thus, in one embodiment, the guides/restraints 920A-G and 930A-G retaining the pallet 910 are mounted outside the wingbox area of the cargo deck 900.

As seen in FIG. 20, the first, or "inboard", ends 950 of these guides/restraints 920A-G and 930A-G connect to the seat tracks 904A, 904B, respectively, while their second, or "outboard", ends 960 connect to the lock trays 906A, 906B, respectively, in a manner described above. Thus, while one or more types of fixation devices connect the first end of the guides/restraints 920A-G and 930A-G to a first retaining device (e.g., either the seat track or the lock tray), different fixation devices connect the second end of the guides/restraints 920A-G and 930A-G to the second retaining device (e.g., the other of the seat track or the lock tray).

In the embodiment of FIG. 20, the 20 foot pallet 910 is retained along the centerline 902 by a plurality of guides/restraints 920A-G and 930A-G that connect at a first end to a seat track 904A, 904B and at a second end to lock trays 906A, 906B, each of the guides/restraints 920A-G and 930A-G having a coaxially mounted guide and lockhead, the guide configured to guide a passing ULD and the lockhead configured to help retain the ULD. The guides/restraints (920A-G and 930A-G are mounted in the cargo deck 900 such that the inboard end 950 of each guide/restraint is closer to the centerline 902 than the outboard end 960 of that guide/restraint. In addition, the inboard end 950 of each guide/restraint is attached to a seat track 904A, 904B, while the outboard end 960 of each guide/restraint is attached to a lock tray 906A, 906B.

While FIG. 20 shows a 20 foot pallet 910 loaded and retained along a centerline 902, it is understood that standard size pallets of other lengths, such as a standard 16 foot pallet or a standard 10 foot pallet may likewise be loaded along the centerline 902. For either a standard 16 foot pallet or a standard 10 foot pallet, a subset of the 14 guides/restraints 920A-G and 930A-G may be employed. For example, in one embodiment, to retain a standard 16 foot pallet along the centerline 902, only six guides/restraints from each row 920, 930, and in particular guides/restraints 920B-G and 930B-G may be used, guide/restraints 920A and 930A not being used. Similarly, to retain a standard 10 foot pallet along the centerline 902, only four guides/restraints from each row 920, 920, and in particular guides/restraints 920C-F and 930C-F may be used, guide/restraints 920A, 920B, 920A, 920G, 930A, 930B, 930G being idle. In some embodiments, especially for the shorter pallets, e.g., the 10 foot pallet, additional restraints may be used to engage the pallet's forward end 916 and/or aft end 918, to further secure the pallet.

In summary, then, the air cargo deck 900 has first and second rows 920, 930 extending parallel to, and on opposite sides of, the centerline 902. Each row 920, 930 comprises a plurality of guides/restraints 920A-G, 930A-G, respectively. In the embodiment shown, the guides/restraints are mounted in the cargo deck 900 such that the first end 950 of a guide/restraint is closer to the centerline 902 than the second end 960 of that guide/restraint, the first end 950 being attached to a seat track and the second end 960 being attached to a lock tray. Finally, these guides/restraints are mounted outside the wingbox area of the cargo deck 902 where transversely extending floor beams provide adequate support for the loads applied by pallets.

A method for loading a standard size pallet 910 along the centerline 902 of an air cargo deck 900 in accordance with one embodiment of the present invention begins with providing the first and second rows 920, 930 of the guides/restraints 920A-G, 920A-G on either side of the centerline 902, in the manner summarized above. Next, the standard size pallet 910 is positioned such that it straddles the centerline 902 with long sides 912, 914 of the pallet 910 overlying a portion of the base of at least some of the guides/restraints in each row 920, 930. Finally, the lockheads of the guides/restraints over which the long sides 912, 914 of pallet 910 overlie must be rotated from the retracted position to the upright position, to thereby retain the standard size pallet 910 in position. It is understood that in some embodiments, the guides 122 of the guides/restraints that are being used in each row 920, 930 may also need to be rotated from the retracted position to the upright position prior to the lockheads 124 being rotated. The pallet 910 may thus be restrained without the use of straps, thus saving time in loading and unloading the aircraft. Prior to loading the pallet 910 onto the cargo deck 900, an item of out-sized cargo (not shown) may be placed on pallet 910.

One may modify existing main cargo decks of certain Boeing 747 air cargo planes so that they can accommodate centerline loading of pallets, such as pallet 910, without the use of straps to tie down the pallet. The cargo decks on these certain planes are already equipped with first and second seat tracks 904A, 904B, respectively, extending parallel to the centerline 902 and positioned on either side thereof, and first and second lock trays 906A, 906B, respectively, extending parallel to the centerline 902 and positioned on either side thereof, each of the first and second lock trays 906A, 906B being spaced apart from a corresponding seat track 904A, 904B, respectively, and being farther from the centerline 902 than its corresponding seat track. Such a cargo deck may be modified by installing one row 920 comprising a first plurality of guides/restraints 920A-G between the first seat track 904A and the first lock tray 906A, and installing a second plurality of guides/restraints 930A-G between the second seat track 904B and the second lock tray 906B. Such a modification allows such a plane to carry standard size pallets that straddle the centerline, without the use of straps to tie down the pallet. As discussed above, in making these modifications, the guides/restraints would be installed outside the wing box area of the air cargo deck 900, and more particularly, aft of the wingbox area.

In the foregoing description, the pallet 910 is retained by the guides/restraints 920A-G, 920A-G without the use of straps. However, in some embodiments, straps may be used in addition to the guides/restraints of the present invention. This provides the necessary flexibility to accommodate unusual loads, non-standard pallets and other ULDs.

Figure 21:
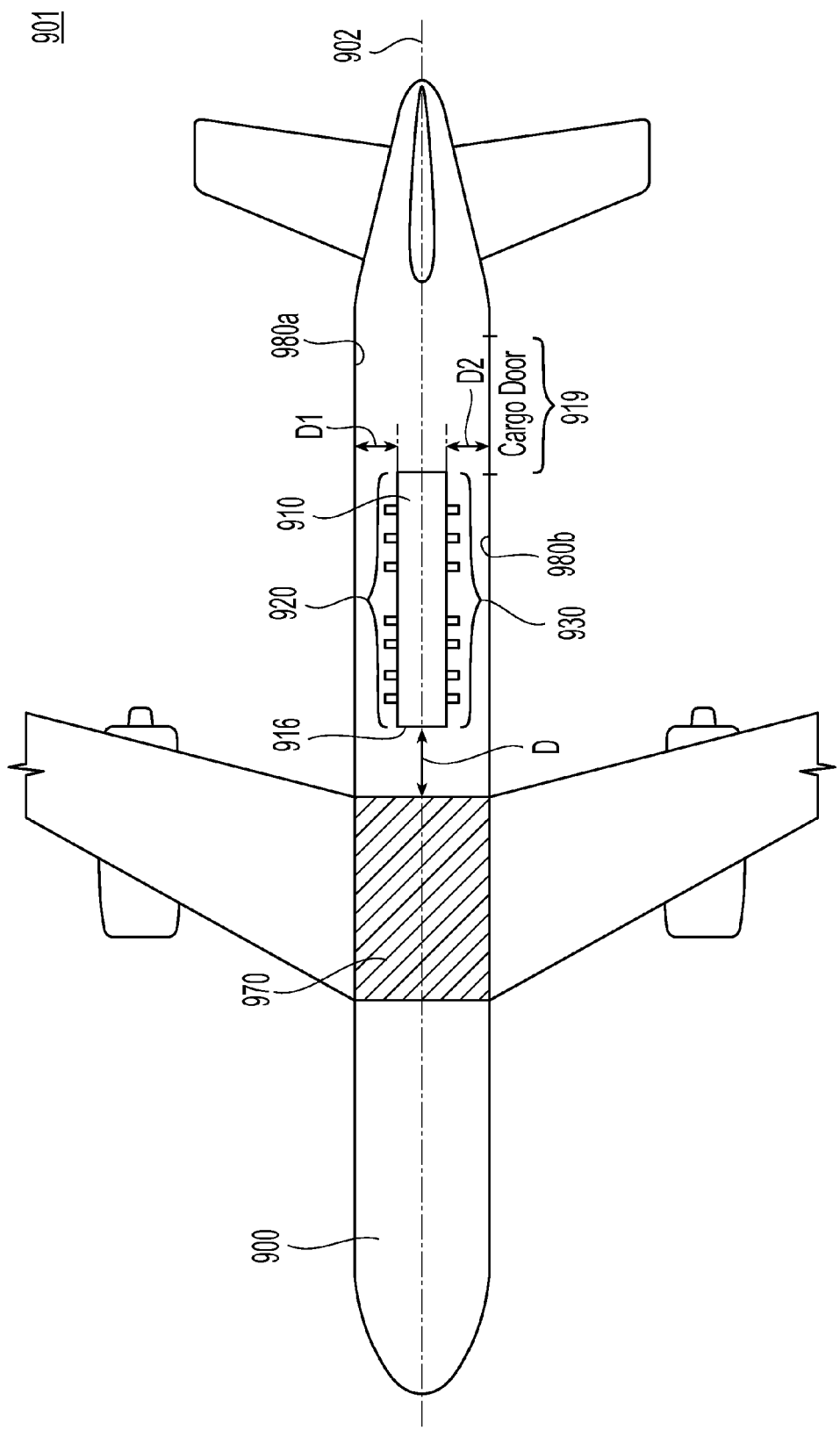
FIG. 21 shows a centerline-mounted 20 foot pallet positioned outside the wingbox area of a main cargo deck.

FIG. 21 illustrates a 20 foot pallet 910 mounted along the centerline 902 of the main cargo deck 900 of a cargo aircraft 901, such as a Boeing 747. More particularly, the 20 foot pallet is mounted outside the wingbox area 970 and most, if not all, of the 20 foot pallet 910 is positioned forward of the aft side cargo door 919. The forward end 916 of the 20 foot pallet is at least a distance D from the wingbox area. In a preferred embodiment, D is about at least 1.5 m, or approximately 5.0 feet, and can range from about 1.5-3.5 m, or approximately 5 feet to about 12 feet. The pallet 910 has a clearance of about D1 from a first sidewall 980A and a maximum clearance of D2 from a second sidewall 980B of the cargo hold. In one embodiment, D1 and D2 are at least 1.5 m or about 5 feet each.

Figure 22:
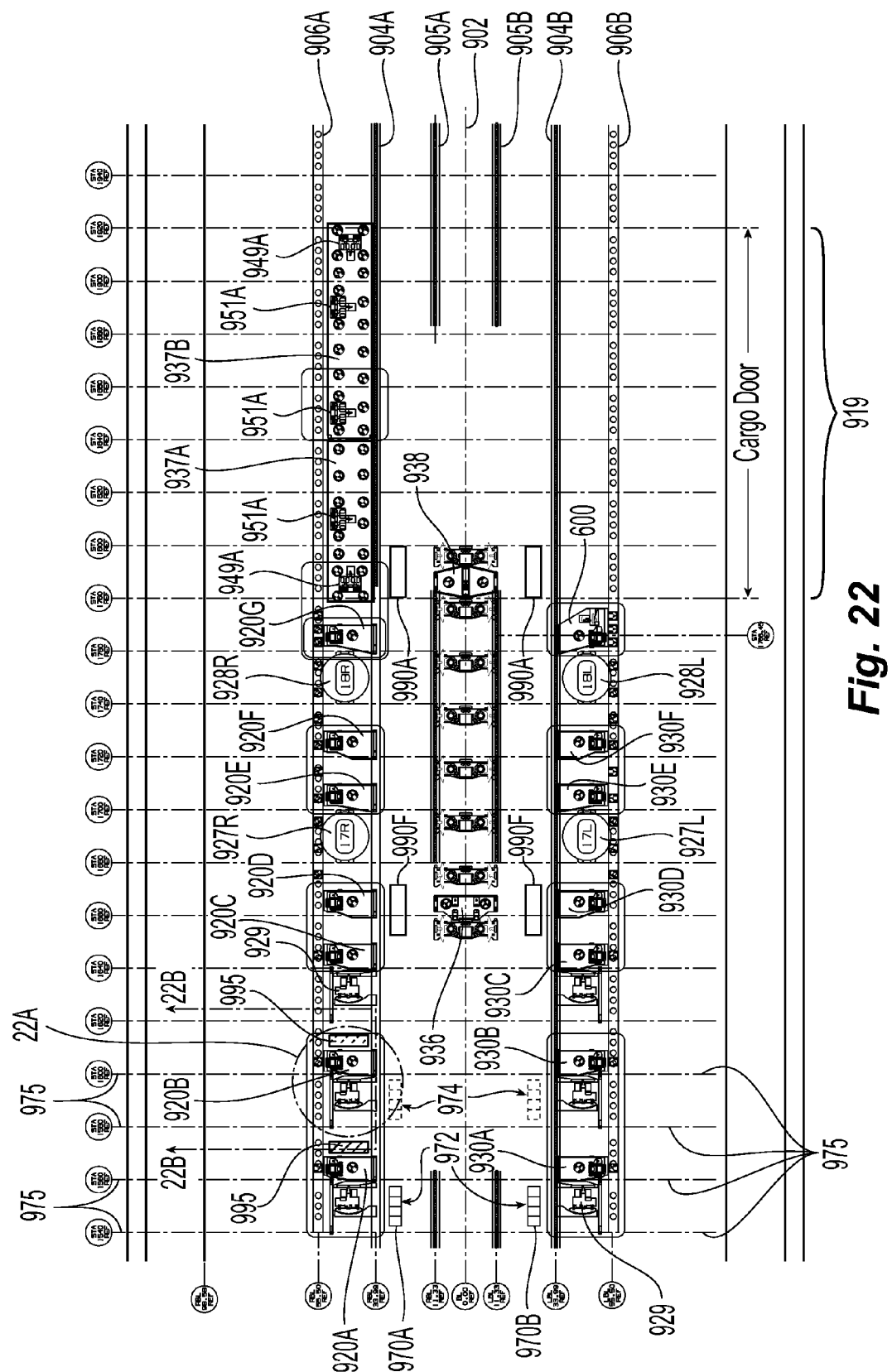
FIG. 22 shows a layout of the principal components of a centerline loading system in accordance with one embodiment of the present invention.

FIG. 22 shows the layout of a centerline cargo loading system in accordance with another embodiment of the present invention. This cargo loading system is configured to selectively accommodate either a 10 foot pallet, a 16 foot pallet or a 20 foot pallet. The depicted centerline cargo loading system includes a number of mechanical guides/restraints 920A-G, 930A-F of the sort described with respect to FIGS. 1-12 and a lead-in guide/restraint 600 of the sort described with respect to FIGS. 16-19, which has an auxiliary guide. In the cargo loading system, the lead-in guide/restraint 600 is positioned closest to the aft side cargo door 919, and in the same row as guide/restraints 930A-F. The various guide/restraints 920A-G, 930A-F and 600 are connected at their outboard ends to lock trays 906A, 906B, and at their inboard ends to seat tracks 904A, 904B.

FIG. 22 shows the layout of these guides/restraints relative to the floor joists 975 supporting the main cargo deck 900, in a region that is outside the wingbox area 970. The floor joists 975, which generally are about 5 cm (2 inches) wide and are centered about 0.5 m (20 inches) apart, extend widthwise of the main cargo deck 900 and thus are perpendicular to the centerline 902. Proximate the side provided with the gusset 220, the inboard end 110, 510 (i.e., the seat-track-end) of each guide/restraint 920A-G, 930A-F and the lead-in guide/restraint 600 overlies a floor joist 975. More particularly, at the gussets 220, the shear bosses 112, 512 are inserted into the circular openings 412 of a corresponding seat track 904A, 904B such that either adjacent shear bosses straddle a floor joist 975, or at least one shear boss 112, 512 is directly above the floor joist 975.

In the enlarged and cross-sectional views FIGS. 22A and 22B showing guide/restraint 920B, adjacent shear bosses 112 at the gusset 220 straddle a floor joist 975. This helps transfer loads applied to the guide/restraint 920B, via the seat track 904B and the subfloor 991 upon which the seat track 904B rests, to the two floor joists 975 shown. Transferring the vertical loads directly into the floor joists 975 also enhances lateral support for the pallets. This is because the floor joists 975 outside the wingbox area 970 extend across the width of the aircraft. A lateral load applied to a laterally extending floor joist 975 is directly transferred to the sides of the aircraft without causing that floor joist to bow (which would be the case, if the floor joist extended longitudinally instead). In this manner, designing and locating the various guides/restraints such that the loads are transferred directly into the laterally extending floor joists 975 provides lateral support, in additional to simply vertical support.

Returning to FIG. 22, the main cargo deck 900, in the region where pallets can be retained along the centerline, is also provisioned with power-lift power drive units (PDUs) 927R, 928R, 927L, 928L, spring-lift PDUs 929, a forward centerline end lock 936, an aft centerline end lock 938, and first and second caster panels 937A, 937B, respectively.

The forward centerline end lock 936 and the aft centerline end lock 938 straddle the centerline 902 and are positioned roughly 3 m (about 10 feet) apart. Both centerline end locks 936, 938 are used to secure the ends of a 10 foot pallet. Each centerline end lock 936, 938 is secured at its opposite ends to spaced apart seat tracks 905A, 905B located at butt lines 11.33, on either side of the centerline 902. A pair of spaced apart cam-operated shear plungers 939 secure each end of each centerline end lock 936, 938 to the spaced apart seat tracks 905A, 905B.

The cargo loading system is further provided with a pair of relocatable end stops 970A, 970B stops configured to arrest axial movement of a pallet introduced into the cargo hold. In one embodiment, such a relocatable end stop comprises an elongated base, a retractable upright member (e.g., a lockhead) rotatably mounted proximate one end of the base, and a spring member which resists forces imparted by a pallet upon the upright member. Attenuated end stop, part number 7M30026-5, available from Goodrich Corporation of Fargo, N. Dak. may be used as the relocatable end stop.

The relocatable end stops 970A,970B are located on either side of the centerline 902, inboard of a pair of parallel seat tracks 904A, 904B, and aft of the wingbox area of the aircraft. When a 20 foot pallet is to be loaded, the relocatable end stops 970A, 970B are mounted at a forward position 972 in which their forwardmost portions are at approximately STA line 1545. When a 16 foot pallet is to be loaded, the relocatable end stops 970A, 970B, seen in phantom in FIG. 22, are mounted in the aft position 974 in which their forwardmost portions are at approximately STA line 1586. In this embodiment, when a 10 foot pallet is loaded, it makes no difference whether the relocatable end stops are mounted in the forward position or in the aft position. The relocatable end stops 970A, 970B serve as "parking stops" when moving either a 20 foot pallet or a 16 foot pallet into position.

Figure 23:
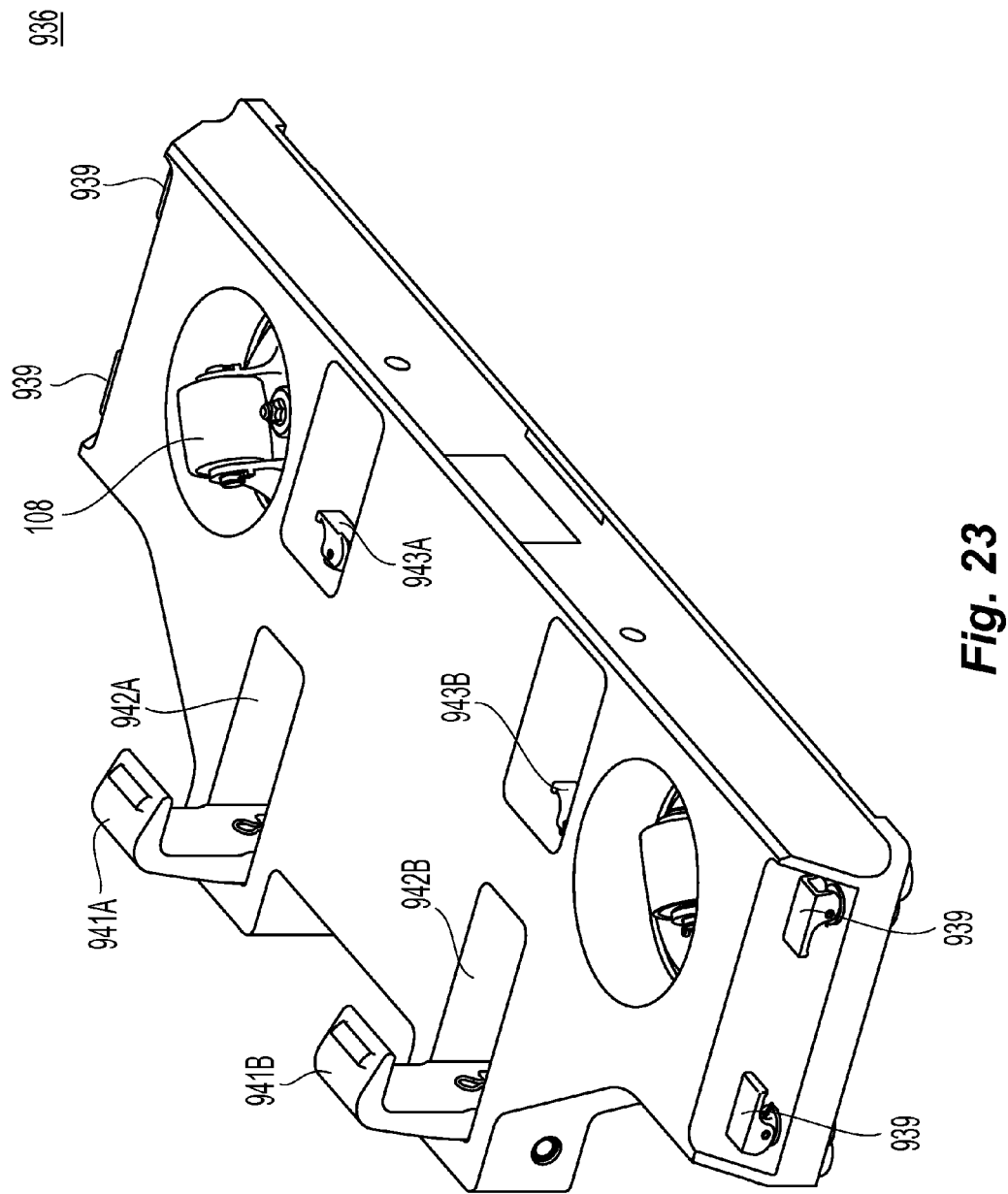
FIG. 23 shows a perspective view of a forward centerline end lock used in the centerline loading system of FIG. 22.

As seen in FIG. 23, the forward centerline end lock 936 comprises a pair of spaced apart, lockheads 941A, 941B which, when in the upright position, face in the aft direction. One lockhead is located on either side of the centerline 902 when the forward centerline end lock 936 is mounted on the main cargo deck 900. When not needed, the lockheads 941A, 941B may occupy a retracted position in which they are received and retained in corresponding recesses 942A, 942B. From the retracted position, the lockheads 941A, 941B may be released by cam-operated pawls 943A, 943B. The top surface of the forward centerline end lock 936 is also provided with a pair of spaced-apart roller-type casters 108 which are outboard of the cam-operated pawls 943A, 934B, and facilitate movement of cargo passing overhead when the lockheads 941A, 941B are in the retracted position.

Figure 24:
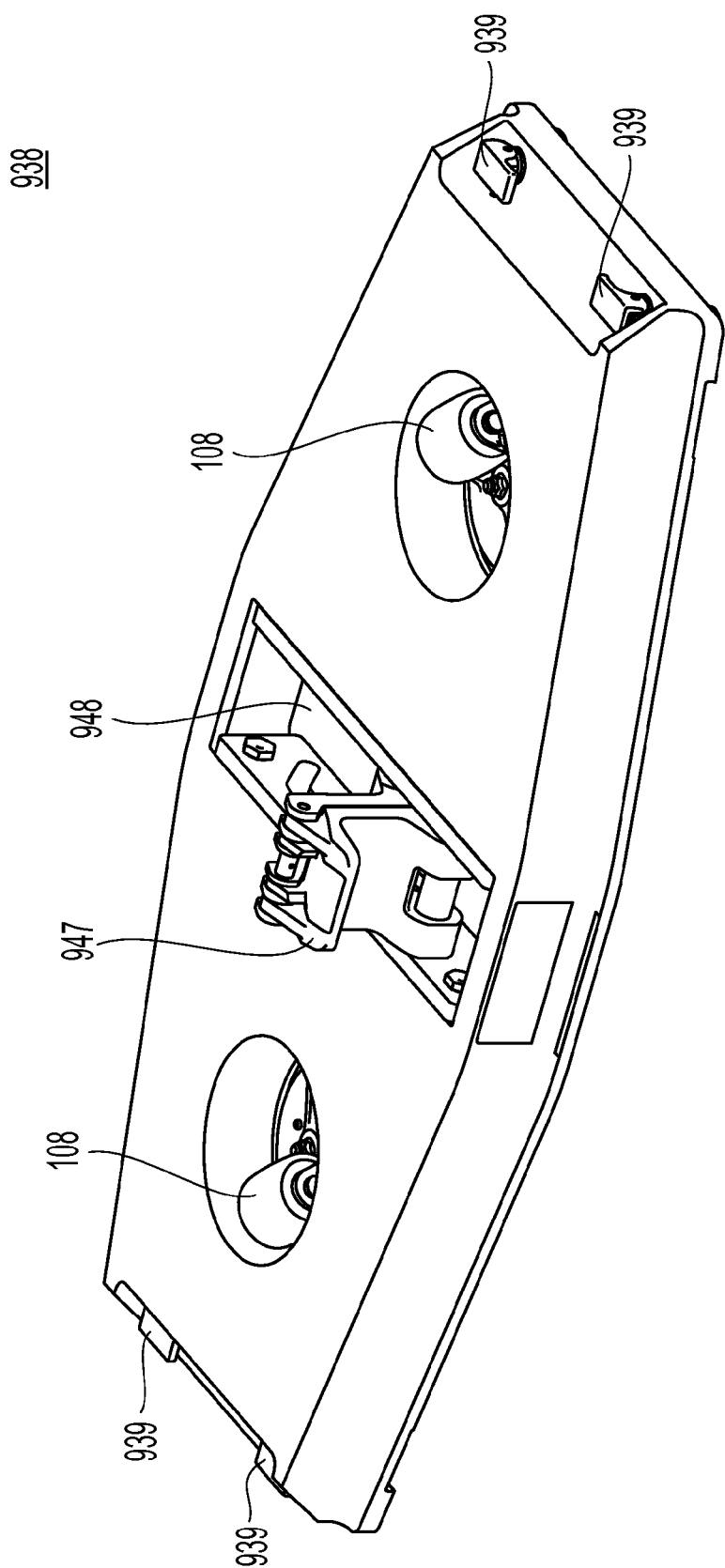
FIG. 24 shows a perspective view of an aft centerline end lock used in the centerline loading system of FIG. 22.

As seen in FIG. 24, the aft centerline end lock 938 comprises a centrally located lockhead 947 which, when upright, faces in the forward direction. When not needed, the centrally located lockhead 947 can occupy a retracted position, in which it is received and retained in a recess 948. The top surface of the aft centerline end lock 936 is also provided with a pair of spaced-apart roller-type casters 108, one on either side of the centrally located lockhead 947, to facilitate movement of cargo overhead when the centrally located lockhead 947 is retracted.

Figure 25:
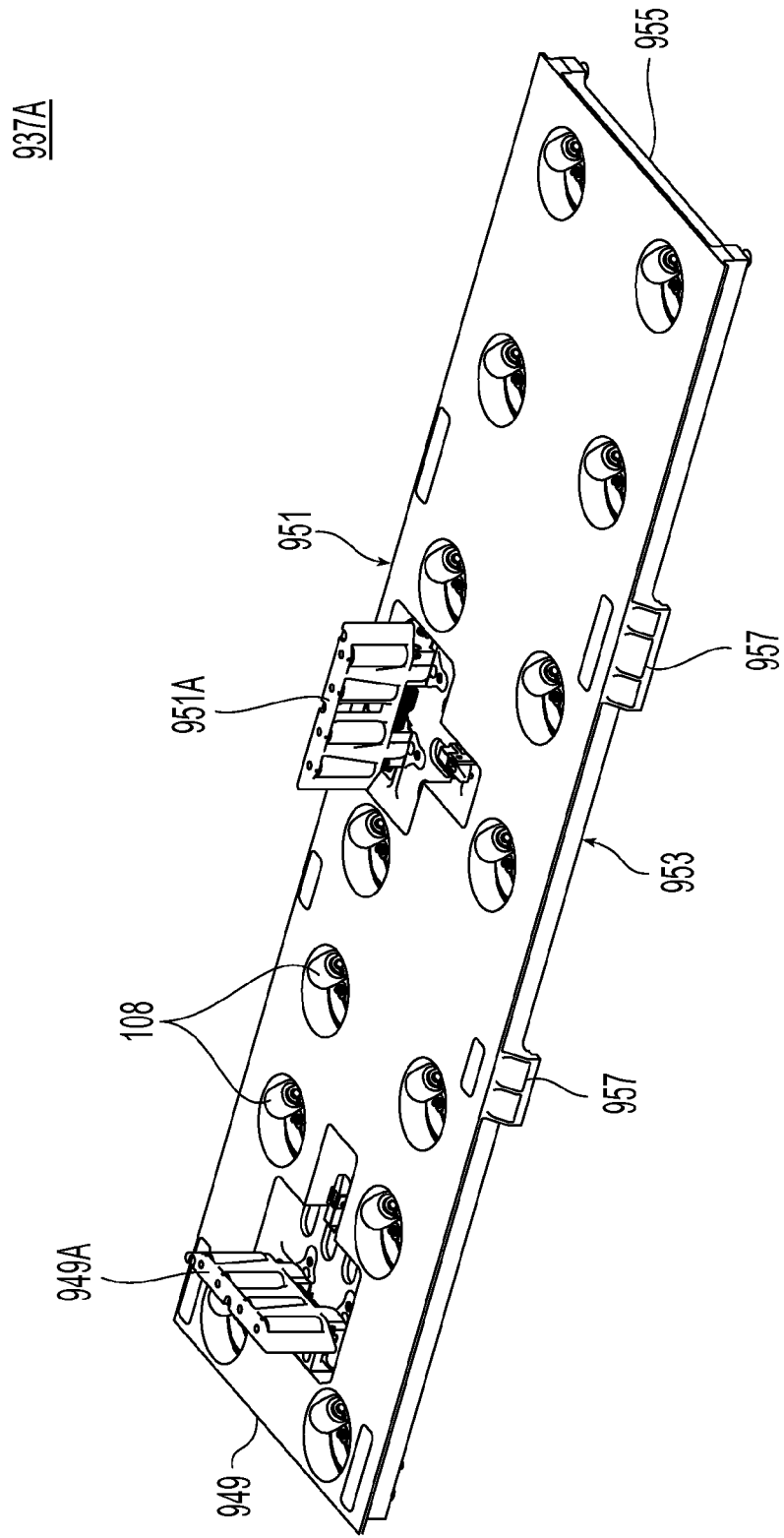
FIG. 25 shows a first caster panel used in the centerline loading system of FIG. 22.
Figure 26:
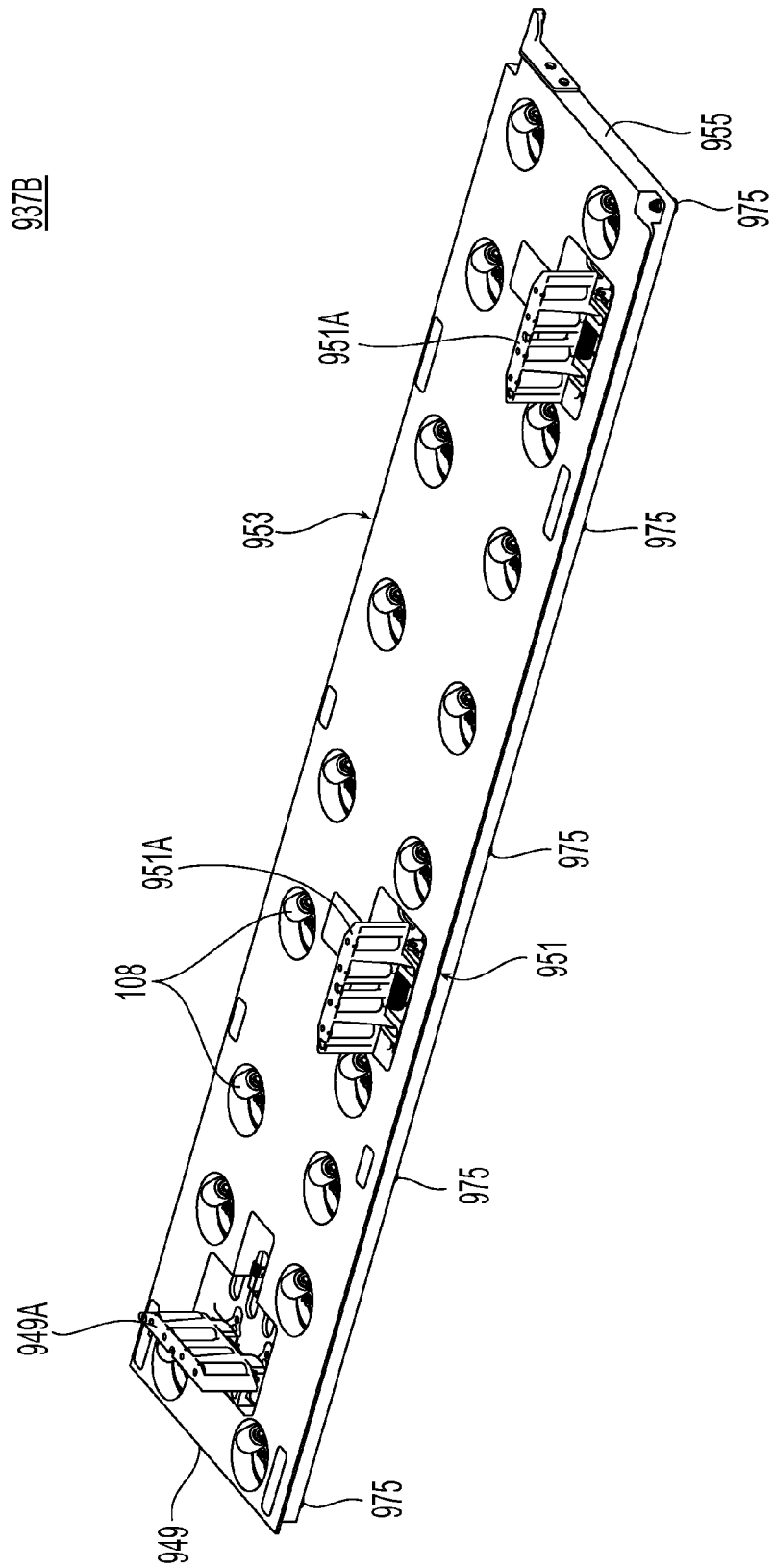
FIG. 26 shows a second caster panel used in the centerline loading system of FIG. 22.

As seen in FIGS. 25 & 26, a first end 949 of each caster panel 937A, 937B is provided with a retractable lateral guide 949A. A first long side 951 of each caster panel 937A, 937B is provided with at least one retractable longitudinal guide 951A, with caster panel 937B being provided with two such longitudinal guides 951A. As seen in FIG. 22, the caster panels 937A, 937B are mounted across from the aft side cargo door 919 on the right side of the air cargo deck 900, and are positioned with their second ends 955 facing one another.

Proximate its first long side 951, the bottom of each caster panel 937A, 937B is provided with a row of shear-boss-type feet 957 (see FIG. 26), which engage floor fittings (not shown) provided on the floor of the main cargo deck 900. This prevents the caster panels 937A, 937B from moving in the axial direction during cargo loading/unloading operations. To prevent lateral movement, the second long side 953 of each caster panel 937A, 937B is provided with integrally formed fittings 957 configured and dimensioned to slide into the seat track 904A. And while separate caster panels 937A, 937B are used in the embodiment of FIG. 22, it is understood that a single caster panel having a length comparable to a combined length of caster panels 937A, 937B may instead be used.

During a loading operation of a 10 foot pallet, the longitudinal guides 951A on both caster panels 937A, 937B may be placed into the upright position and serve as guides for sides of a pallet that enters through the aft side cargo door 919 and is propelled in the forward direction of the main cargo deck 900.

Near its base, the sides of a 16 foot pallet or a 20 foot pallet are provided with retaining slots (not shown) that are spaced approximately 20⅛ inches apart. It is into these retaining slots that the lockheads 124 of the guides/restraints 920A-G, 930A-F and the lead-in guide/restraint 600 are inserted to prevent axial, lateral and also (upward) vertical movement of the pallet. Meanwhile, the centers of the circular openings 412 of a seat track 904A, 904B, into which the shear bosses 112 of the guides/restraints are inserted, are spaced one inch apart. The relative spacings of the retaining slots and the circular openings 412, the requirement that the loads be transferred into the floor joists 975, and the presence of power-lift PDUs 927R, 927L, 928R, 928L, spring-lift PDUs 929 and other components in this portion of the main cargo deck 900, place constraints on the design and placement of the various guides/restraints 920A-G, 930A-F and the lead-in guide/restraint 600. In one embodiment of the cargo loading system, 14 different models of guides/restraints are required, of which 13 are of a first type (such as seen in FIGS. 1-12) and one is of a second type (such as seen in FIGS. 16-19). Even among the 13 guide/restraints of the first type, each may slightly differ from the others in the design, size and location (left or right side) of the gusset 220 and the shear bosses 112 and/or the lockheads 124. One embodiment of the process for loading a 10 foot pallet (code M pallet per NAS 3610) along the centerline 902 is now described. Initially, at least the following guides and lockheads should be in the upright position: (1) the longitudinal guides 951A of the caster panels 937A, 937B; (2) the guides 122 (see FIG. 1) of four guides/restraints 920D-G on one side of the centerline 902; (3) the guides 122 of three guides/restraints 930D-F on the other side of the centerline 920; (4) the guide 522 (see FIG. 16) of the lead-in guide/restraint 600; and (5) the lockheads 941A, 941B of the forward centerline end lock 936. The lockheads of both spaced-apart forward pallet locks 990F should also be upright. Initially, at least the following guides and lockheads should be in the retracted position: (1) the lockhead 947 of the aft centerline end lock 938; (2) the lockheads 124 (see FIG. 1) of guides/restraints 920A-920G and 930A-930F; and (3) the lockhead 524 (see FIG. 17) of the lead-in guide/restraint 600. The lockheads of the aft pallet locks 990A, lateral guides, centerline restraints, bumpers and other components present in the span between the doorway 919 and the forward centerline end lock 936, should also initially be in the retracted position.

Once this initial configuration has been established, the 10 foot pallet is brought into the cargo compartment via the aft side cargo door 919 and initially positioned longitudinally against the longitudinal guides 951A of the caster panels 937A, 937B. The 10 foot pallet is then moved in the forward direction until the forward edge of the 10 foot pallet lines up against the forward pallet locks 990F. Next, the lockhead 947 of the aft centerline end lock 938, the lockhead of the aft pallet locks 990A, the lockheads 124 belonging to seven guide/restraints 920D-G, 930D-F and the lockhead 524 of the lead-in guide/restraint 600 are adjusted from their retracted positions to the upright position.

As a result, the upright lockheads 941A, 941B of the forward centerline end lock 936 and the forward pallet locks 990F overlap a portion of the forward end of the 10 foot pallet while the upright lockhead 947 of the aft centerline end lock 938 and the aft pallet locks 990A all overlap a portion of the aft end of the 10 foot pallet. This restrains the 10 foot pallet in both the axial direction of the cargo compartment, and in the vertical direction. Similarly, the seven lockheads 124 of guide/restraints 920D-G, 930D-F and the lockhead 524 of the lead-in guide/restraint 600 each overlap a portion of the sides of the 10 foot pallet, thereby providing the foot pallet with both lateral and vertical restraint. In this manner, the centerline end locks 936, 938, the seven guide/restraints 920D-G, 930D-F and lead-in guide/restraint 600 (for a total of eight side restraints) and the pairs of pallet locks 990A, 990F collectively provide vertical, axial and lateral restraint of the 10 foot pallet without the use of straps, each of the guides/restraints 920D-G, 930D-F and lead-in guide/restraint 600 being mounted so as to overlay a floor joist 975 and thereby transfer the load to the airframe.

In the above description for retaining a 10 foot pallet, the lockheads 941A, 941B of the forward centerline end lock 936 start in upright position. However, they may instead start in a retracted position, and then be adjusted to the upright position for engaging the retaining slots only after the 10 foot pallet has reached its final position.

One embodiment of the process for loading a 16 foot pallet (code R pallet per NAS 3610) along the centerline 902 is now described. As a preparatory matter, the relocatable end stops 970A, 970B should be mounted in the aft position 974, and the lockheads of these relocatable end stops 970A, 970B should be upright. Initially, at least the following guides and lockheads should be in the retracted position: (1) the lockheads 941A, 941B of the forward centerline end lock 936 and the forward pallet locks 990F; (2) the lockhead 947 of the aft centerline end lock 938 and the aft pallet locks 990A; (3) the guides 122 and lockheads 124 (see FIG. 1) of the guides/restraints 920A-920G and 930A-930F; (4) the guides 522, 704 and lockhead 524 (see FIGS. 16-17) of the lead-in guide/restraint 600; and (5) the retractable lateral guides 949A and the longitudinal guides 951A of the caster panels 937A, 937B. Lockhead and upright members of any other lateral guides, centerline restraints, bumpers and other components present in the span between the doorway 919 and the far side of the two forwardmost guide/restraints 920A, 920B should also initially be in the retracted position.

Once this initial configuration has been established, the 16 foot pallet is brought into the cargo compartment via the aft side cargo door 919 and rotated to have a longitudinal orientation. The longitudinal guides 951A of the caster panels 937A, 937B are adjusted to their upright position, as are the guides 122 belonging to aftmost six guide/restraints 920B-G on the right hand side of the centerline 902. The 16 foot pallet is then positioned longitudinally against the upright longitudinal guides 951A of the caster panels 937A, 937B and the upright longitudinal guides 122 of the aftmost six right side guide/restraints 920B-G. The guides 122 belonging to the aftmost six guide/restraints 930B-F and the guide 522 of the lead-in guide/restraint 600 on the left hand side of the centerline 902 are then adjusted from the retracted position to the upright position. The 16 foot pallet is then moved forward against the retractable end stops 970A, 970B occupying the aft (16 foot) position 974. The lockheads 124 of the aftmost six guide/restraints on both sides of the centerline, 920B-G and 930B-F and the lead-in guide restraint 600, are then adjusted from their retracted positions to the upright position. As a consequence, the twelve corresponding lockheads 124 and 524 engage slots formed on the sides of the 16 foot pallet. In this manner, the twelve guide/restraints 920B-G and 930B-F and the lead-in guide restraint 600 (for a total of twelve side restraints) provide axial, lateral and vertical restraint of the 16 foot pallet without the use of straps, each such guide/restraint being mounted so as to overlay a floor joist 975 and thereby transfer the load to the airframe.

It can be seen that in the foregoing embodiment of retaining a 16 foot pallet, the lockheads 941A, 941B of the forward centerline end lock 936, the lockhead 947 of the aft centerline end lock, and the lockheads 124 of guide/restraint 920G and the lockhead 524 of lead-in guide/restraint 600 remain unused.

One embodiment of loading and retaining a 20 foot pallet (Code G per NAS 3610) along the centerline 902 is similar to loading and retaining a 16 foot pallet. The principal differences are that: (1) during set-up, the relocatable end stops 970A, 970B occupy the forward position 972; and (2) the lockheads 124 of guide/restraints 920A and 930AG and the lockhead 524 of lead-in guide/restraint 600 are also used, due to the slightly longer length of the 20 foot pallet. In this manner, the thirteen guide/restraints 920A-G, 930A-F of the first type, and the lead-in guide/restraint 600 of the second type (for a total of fourteen side restraints), plus the relocatable end stops 970A, 970B in the forward position 972 provide axial, lateral and vertical restraint of the 20 foot pallet without the use of straps, each of the guide/restraints being mounted so as to overlay a floor joist 975.

The hardware on the main cargo deck of an existing cargo aircraft, such as a Boeing 747 cargo aircraft, may be modified in accordance with the present invention so as to provide for centerline loading of different size pallets. In one embodiment, a kit for modifying such a cargo aircraft may include the above-described centerline end locks 936, 938, which are mountable on the centerline 902 and spaced apart from each other by a first predetermined distance. The kit would also include one or more caster panels 937A, 937B mountable on one side of the cargo hold and across the centerline 902 from the aft side cargo door 919 of the aircraft. The kit would further include the set of thirteen restraints 920A-G, 930A-F of a first type and a lead-in guide/restraint 600 of a second type. These fourteen restraints each are mountable on a floor of the cargo hold on either side of the centerline 902. As described above, the lead-in guide/restraint 600 would have an auxiliary guide 704 not included in the remaining restraints. In addition, the kit may include the relocatable end stops 970A, 970B. The kit may also include a plurality of floor markers 995 to be placed on the cargo floor to help indicate where the pallets should be positioned during loading operations, and placards to be mounted on the side walls of the cargo compartment and display instructions. Additional hardware, such as unicaster panels for the doorway area, may also be included in such a kit.

In other embodiments, the kit may include fourteen guides/restraints of the first type and none of the second type. In still other embodiments, the kit may have a lesser number of guides/restraints, especially in those cases where the cargo hold of the aircraft is only expected to accommodate 10 foot and 16 foot pallets, and not 20 foot pallets.

A method of modifying the main cargo deck 900 of a cargo aircraft, such as a Boeing 747 cargo aircraft, so that its cargo hold can accommodate any one of a plurality of pallets of different lengths along a centerline 902 of the aircraft, entails mounting a number of the aforementioned devices in specific locations. The main cargo deck may already have the various seat tracks 904a, 904b, 905a, 905b and lock trays 906a, 906b in place. In addition, the main cargo deck may already have such things as lateral guides, centerline restraints, bumpers and other components. To modify the main cargo deck 900 of a cargo aircraft such as a Boeing 747, the centerline end locks 936, 938 would each need to be mounted on the centerline 902 using seat tracks 905a, 905b. The centerline end locks 936, 938 would be spaced apart from each other along the centerline 902 by a first predetermined distance. In one embodiment, this predetermined distance is approximately 3 m or 10 feet. In addition, one or more caster panels 937A, 937B should be mounted on one side of the cargo hold and across the centerline 902 from the aft side cargo door 919 of the aircraft. Furthermore, the relocatable end stops 970A, 970B should be available for placement in either position 972 or 974, and the two pairs of pallet locks 990A, 990F placed at their designated locations. Finally, a plurality of mechanical restraints 920A-G, 930A-F and 600 should be mounted on the floor of the cargo hold using the seat tracks 904a, 904b and lock trays 906a, 906b, as appropriate, on either side of the centerline by and outside the aircraft's wingbox area 970. Each such restraint should also at least partially overlie a laterally extending floor joist 975 so as to transfer lateral loads. The lead-in guide/restraint 600, which is to be placed closest the aft side cargo door 919, would have an auxiliary guide 704 not included in the remaining restraints.

While the present invention has been described herein above in connection with a plurality of aspects and embodiments, it is understood that these aspects and embodiments were presented by way of example with no intention of limiting the invention. Accordingly, the present invention should not be limited to any specific embodiment or aspect, but rather construed in breadth and broad scope in accordance with the recitation of the claims appended hereto.

What is claimed is:

1. A method of modifying a cargo aircraft so that a cargo hold thereof can accommodate any one of a plurality of standard-sized pallets of different lengths along a centerline of the aircraft, the method comprising:
   mounting first and second centerline end restraints on the centerline and spaced apart from each other by a first predetermined distance, the centerline end restraints each comprising at least one retractable lockhead, the first predetermined distance selected such that the centerline restraints are capable of engaging opposite ends of a pallet of a first predetermined length;
   mounting at least one caster panel on one side of the cargo hold and across the centerline from a side door of the aircraft, the at least one caster panel comprising at least one retractable guide formed at a first end thereof, and at least one retractable guide formed along a first side thereof; and
   mounting at least eight mechanical restraints on a floor of the cargo hold on either side of the centerline, each of said mechanical restraints including a lockhead rotatable between a retracted position and an upright position; wherein:
   at least a portion of each of said mechanical restraints overlies a laterally extending floor joist in the cargo hold; and
   said first and second centerline restraints, said at least one caster panel and said at least eight mechanical restraints are all mounted aft of a wingbox area of the cargo aircraft.

2. The method according to claim 1, comprising:
   providing each of the mechanical restraints with a first guide coaxially mounted with the lockhead and rotatable between a retracted position and an upright position;
   providing at least one of the mechanical restraints with an auxiliary guide not included in the remaining mechanical restraints, and
   mounting said at least one of the mechanical restraints closest to a side doorway of the cargo hold.

3. The method according to claim 1, comprising:
   mounting at least two such caster panels; and
   mounting a pair of forward relocatable end stops on either side of the centerline and inboard of a pair of parallel seat tracks.

4. The method according to claim 1, further comprising:
   mounting a plurality of floor markers on the cargo hold floor to help indicate where at least one pallet should be positioned during loading operations.

5. The method according to claim 1, comprising modifying a Boeing 747 cargo aircraft.

6. The method according to claim 1, comprising:
   providing each of the mechanical restraints with a first guide coaxially mounted with the lockhead and rotatable between a retracted position and an upright position;
   providing at least one of the mechanical restraints with an auxiliary guide not included in the remaining mechanical restraints,
   mounting at least two such caster panels;
   mounting a pair of forward relocatable end stops on either side of the centerline and inboard of a pair of parallel seat tracks; and
   mounting a plurality of floor markers on the cargo hold floor to help indicate where at least one pallet should be positioned during loading operations.

7. The method according to claim 6, comprising:
   mounting at least twelve mechanical restraints on a floor of the cargo hold on either side of the centerline and aft of a wingbox area of the cargo aircraft, so that the cargo hold can accommodate a sixteen-foot pallet.

8. The method according to claim 6, comprising:
   mounting at least fourteen mechanical restraints on a floor of the cargo hold on either side of the centerline and aft of a wingbox area of the cargo aircraft, so that the cargo hold can accommodate a twenty-foot pallet.

9. The method according to claim 1, comprising:
   mounting at least twelve mechanical restraints on a floor of the cargo hold on either side of the centerline and aft of a wingbox area of the cargo aircraft, so that the cargo hold can accommodate a sixteen-foot pallet.

10. The method according to claim 1, comprising:
    mounting at least fourteen mechanical restraints on a floor of the cargo hold on either side of the centerline and aft of a wingbox area of the cargo aircraft, so that the cargo hold can accommodate a twenty-foot pallet.

* * * * *